United States Patent
Liu et al.

(10) Patent No.: US 9,261,738 B2
(45) Date of Patent: Feb. 16, 2016

(54) FRESNEL LIQUID CRYSTAL LENS AND 2D/3D SWITCHABLE DISPLAY PANEL

(71) Applicant: AU Optronics Corp., Hsin-Chu (TW)

(72) Inventors: Sheng-Chi Liu, Hsin-Chu (TW); Po-Sen Yang, Hsin-Chu (TW); Yi-Lin Sun, Hsin-Chu (TW); Jen-Lang Tung, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/542,642

(22) Filed: Nov. 16, 2014

(65) Prior Publication Data

US 2015/0219970 A1  Aug. 6, 2015

(30) Foreign Application Priority Data

Feb. 5, 2014 (TW) .............................. 103103809 A

(51) Int. Cl.
| | | |
|---|---|---|
| G02F 1/1335 | (2006.01) | |
| G02F 1/1343 | (2006.01) | |
| G02F 1/133 | (2006.01) | |
| G02F 1/1333 | (2006.01) | |
| G02B 27/22 | (2006.01) | |

(52) U.S. Cl.
CPC ...... *G02F 1/134309* (2013.01); *G02F 1/13306* (2013.01); *G02F 1/13338* (2013.01); *G02B 27/2214* (2013.01); *G02F 2001/134345* (2013.01)

(58) Field of Classification Search
CPC ..................... G02F 1/134309; G02F 1/13306; G02F 1/13338; G02F 2001/134345; G02B 27/2214
See application file for complete search history.

(56) References Cited

U.S. PATENT DOCUMENTS

| | | | |
|---|---|---|---|
| 2003/0098945 A1 | 5/2003 | Sugimoto | |
| 2011/0157171 A1 | 6/2011 | Lin | |
| 2013/0257840 A1* | 10/2013 | Kim ........................ | G09G 3/003 345/212 |
| 2014/0063430 A1* | 3/2014 | Kashiwagi .......... | G02B 27/2214 349/139 |
| 2014/0104556 A1* | 4/2014 | Takagi ................ | G02F 1/13306 349/143 |
| 2014/0118644 A1* | 5/2014 | Liu ..................... | G02B 27/2214 349/15 |
| 2014/0152923 A1 | 6/2014 | Liu | |
| 2015/0177571 A1* | 6/2015 | Yoshida ............. | G02F 1/134363 349/33 |

FOREIGN PATENT DOCUMENTS

| | | |
|---|---|---|
| CN | 103091929 | 5/2013 |
| JP | H09304748 A | 11/1997 |

* cited by examiner

*Primary Examiner* — Donald Raleigh
(74) *Attorney, Agent, or Firm* — Winston Hsu; Scott Margo

(57) ABSTRACT

A Fresnel liquid crystal lens and a 2D/3D switchable display panel are provided. The Fresnel liquid crystal lens includes a plurality of liquid crystal lens units. Each liquid crystal lens unit includes a first main electrode and two first sub electrodes disposed on a first substrate, a second main electrode and two second sub electrodes disposed on a second substrate, and a liquid crystal layer disposed between the first and second substrates. The first sub electrodes are disposed on two opposite sides of the first main electrode, and a first gap is formed between the first main electrode and the first sub electrode. The second sub electrodes are disposed on two opposite sides of the second main electrode, and a second gap is formed between the second main electrode and the second sub electrode. In a vertical projection direction, the first main electrode overlaps the second main electrode, the first sub electrodes overlap the second sub electrodes, and the first main electrode partially overlaps the second sub electrodes.

16 Claims, 14 Drawing Sheets

FRESNEL LIQUID CRYSTAL LENS AND 2D/3D SWITCHABLE DISPLAY PANEL

BACKGROUND OF THE DISCLOSURE

1. Field of the Disclosure

The present disclosure relates to a Fresnel liquid crystal lens and a display panel, and more particularly, to a Fresnel liquid crystal lens and a two-dimension/three-dimension (2D/3D) switchable display panel.

2. Description of the Related Art

Liquid crystal lens (LC lens) is a lens having gradient phase retardation effect formed by liquid crystal material. When supplying the liquid crystal lens with driving voltage, the axial distribution of liquid crystal molecules will be modified to provide zoom effect. Thus, LC lens has been used in 3D display device (also known as stereoscopic display device) as a component for switch between 2D and 3D display modes.

The phase retardation variation of the conventional LC lens, however, is inferior to that of a real optical lens, and thus the lenticular effect and zoom effect of the conventional LC lens are not satisfactory. In addition, due to the interaction between rubbing alignment and fringe effect generated at the edge of electrode, disclination lines tend to occur between liquid crystal molecules, which causes optical defect when displaying. Also, the conventional LC lens has to be driven by a high driving voltage, which increases power consumption.

SUMMARY OF THE DISCLOSURE

It is therefore one of the objectives of the present disclosure to provide a Fresnel liquid crystal lens and a 2D/3D switchable display panel with low driving voltage and without disclination line defect.

According to an embodiment of the present disclosure, a Fresnel liquid crystal lens is provided. The Fresnel liquid crystal lens includes a first substrate, a second substrate, a liquid crystal layer, a plurality of first liquid crystal lens units and a plurality of second liquid crystal lens units. The second substrate is disposed opposite to the first substrate. The liquid crystal layer is disposed between the first substrate and the second substrate. Each of the first liquid crystal lens units comprises a first main electrode, at least two first sub electrodes, a second main electrode and at least two second sub electrodes. The first main electrode is disposed on a surface of the first substrate facing the liquid crystal layer, wherein the first main electrode has a first voltage. The first sub electrodes are disposed on the surface of the first substrate facing the liquid crystal layer and located on two opposite sides of the first main electrode, wherein the first sub electrodes have a second voltage, and a first gap exists between the first main electrode and each of the first sub electrodes. The second main electrode is disposed on a surface of the second substrate facing the liquid crystal layer, wherein the second main electrode has a third voltage. The second sub electrodes are disposed on the surface of the second substrate facing the liquid crystal layer and located on two opposite sides of the second main electrode, wherein the second sub electrodes have a fourth voltage, a second gap exists between the second main electrode and each of the second sub electrodes, the first main electrode overlaps the second main electrode in a vertical projection direction, the first sub electrodes overlap the second sub electrodes in the vertical projection direction respectively, and the first main electrode partially overlaps the second sub electrodes in the vertical projection direction respectively. The second liquid crystal lens units and the first liquid crystal lens units are arranged alternately. Each of the second liquid crystal lens units comprises a third main electrode, at least two third sub electrodes, a fourth main electrode and at least two fourth sub electrodes. The third main electrode is disposed on the surface of the second substrate facing the liquid crystal layer, wherein the third main electrode has a fifth voltage. The third sub electrodes are disposed on the surface of the second substrate facing the liquid crystal layer and located on two opposite sides of the third main electrode, wherein the third sub electrodes have a sixth voltage, and a third gap exists between the third main electrode and each of the third sub electrodes. The fourth main electrode is disposed on the surface of the first substrate facing the liquid crystal layer, wherein the fourth main electrode has a seventh voltage. The fourth sub electrodes are disposed on the surface of the first substrate facing the liquid crystal layer and located on two opposite sides of the fourth main electrode, wherein the fourth sub electrodes have an eighth voltage, a fourth gap exists between the fourth main electrode and each of the fourth sub electrodes, the third main electrode overlaps the fourth main electrode in the vertical projection direction, the third sub electrodes overlap the fourth sub electrodes in the vertical projection direction respectively, and the third main electrode partially overlaps the fourth sub electrodes in the vertical projection direction respectively.

According to another embodiment of the present disclosure, a 2D/3D switchable display panel is provided. The 2D/3D switchable display panel comprises the aforementioned Fresnel liquid crystal lens and a display panel. The display panel overlaps the Fresnel liquid crystal lens. The display panel includes a third substrate, a fourth substrate disposed opposite to the third substrate, and a display medium layer, disposed between the third substrate and the fourth substrate.

These and other objectives of the present disclosure will no doubt become obvious to those of ordinary skill in the art after reading the following detailed description of the preferred embodiment that is illustrated in the various figures and drawings.

DETAILED DESCRIPTION

To provide a better understanding of the present disclosure, preferred embodiments will be made in detail. The preferred embodiments of the present disclosure are illustrated in the accompanying drawings with numbered elements.

Figure 1:
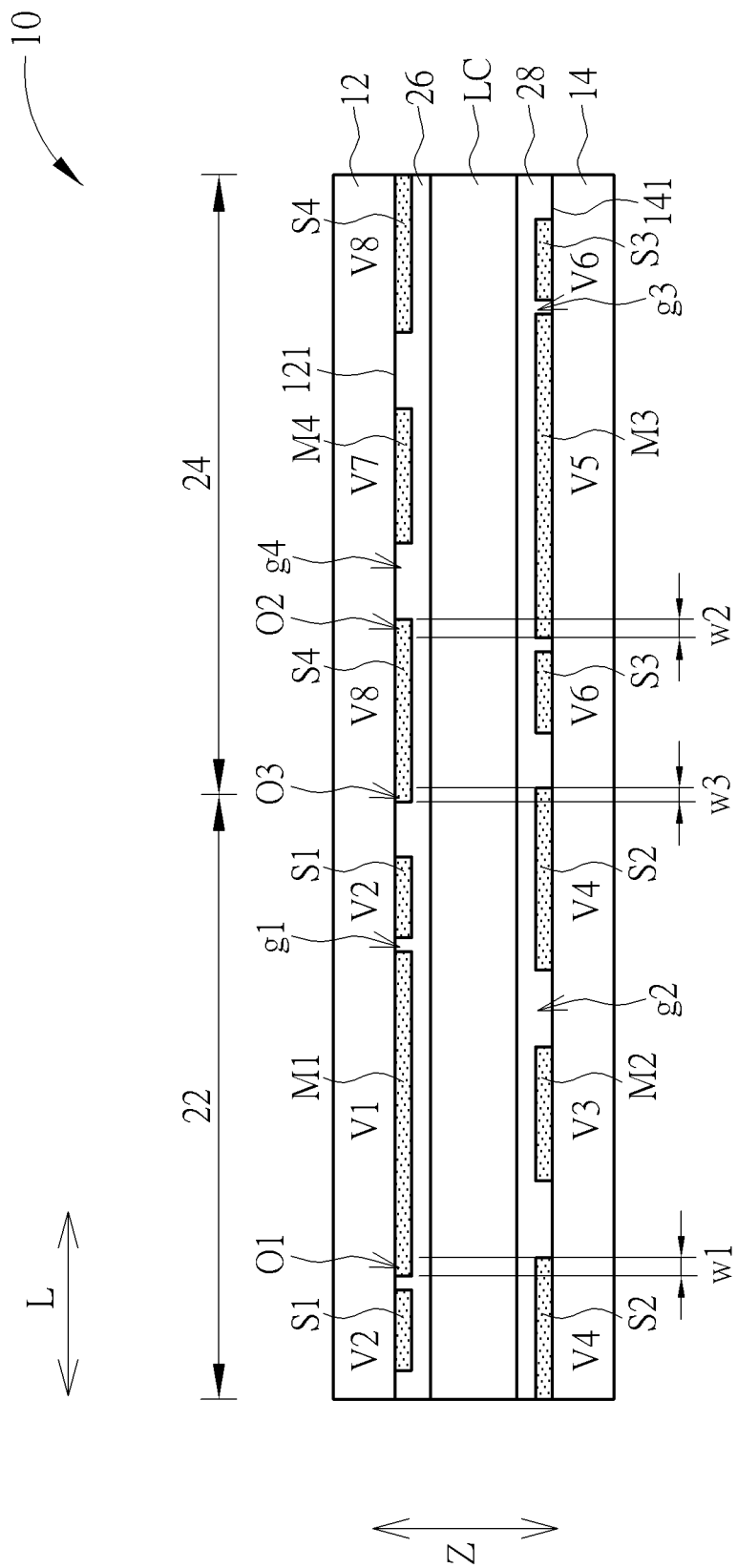
FIG. 1 is a schematic diagram illustrating a Fresnel liquid crystal lens according to a first embodiment of the present disclosure.

Refer to FIG. 1. FIG. 1 is a schematic diagram illustrating a Fresnel liquid crystal lens according to a first embodiment of the present disclosure. As shown in FIG. 1, the Fresnel liquid crystal lens 10 includes a first substrate 12, a second substrate 14, a liquid crystal layer LC, a plurality of first liquid crystal lens units 22 and a plurality of second liquid crystal lens units 24. The first substrate 12 and the second substrate 14 are disposed oppositely and facing each other, and the liquid crystal layer LC is disposed between the first substrate 12 and the second substrate 14. The first liquid crystal lens units 22 and the second liquid crystal lens units 24 are arranged alternately (or namely staggered arrangement), for example, along a linear direction L, but not limited thereto. For the convenience of illustration, only one first liquid crystal lens unit 22 and one second liquid crystal lens unit 24 adjacent to each other are shown in the drawing. In an alternative embodiment, the first liquid crystal lens units 22 and the second liquid crystal lens units 24 may be arranged alternately along two non-parallel linear directions, i.e. the first liquid crystal lens units 22 and the second liquid crystal lens units 24 may be arranged in a two dimensional plane to form a liquid crystal lens array.

Each of the first liquid crystal lens units 22 comprises a first main electrode M1, at least two first sub electrodes S1, a second main electrode M2 and at least two second sub electrodes S2. The first main electrode M1 is disposed on a surface 121 of the first substrate 12 facing the liquid crystal layer LC. The first sub electrodes S1 are disposed on the surface 12S of the first substrate 12 facing the liquid crystal layer LC and located on two opposite sides of the first main electrode M1, where a first gap g1 exists between the first main electrode M1 and one of the first sub electrodes S1, and another first gap g1 between the first main electrode M1 and the other one of the first sub electrodes S1. Specifically, a first gap g1 exists between the left side of the first main electrode M1 and the left first sub electrode S1, and another first gap g1 between the right side of the first main electrode M1 and the right first sub electrode S1. The second main electrode M2 is disposed on a surface 141 of the second substrate 14 facing the liquid crystal layer LC. The second sub electrodes S2 are disposed on the surface 141 of the second substrate 14 facing the liquid crystal layer LC and located on two opposite sides of the second main electrode M2, where a second gap g2 exists between the second main electrode M2 and one of the second sub electrodes S2, and another second gap g2 exists between the second main electrode M2 and the other one of the second sub electrodes S2. Specifically, a second gap g2 exists between the left side of the second main electrode M2 and the left second sub electrode S2, and another second gap g2 exists between the right side of the second main electrode M2 and the right second sub electrode S2. In a vertical projection direction Z, the first main electrode M1 overlaps the second main electrode M2, the first sub electrodes S1 overlap the second sub electrodes S2 respectively, and the first main electrode M1 partially overlaps the second sub electrodes S2 respectively. To be exact, one side (e.g. the left side) of the first main electrode M1 partially overlaps one of the second sub electrodes S2, and the other side (e.g. the right side) of the first main electrode M1 partially overlaps the other one of the second sub electrodes S2.

Each of the second liquid crystal lens units 24 comprises a third main electrode M3, at least two third sub electrodes S3, a fourth main electrode M4 and at least two fourth sub electrodes S4. The third main electrode M3 is disposed on the surface 141 of the second substrate 14 facing the liquid crystal layer LC. The third sub electrodes S3 are disposed on the surface 141 of the second substrate 14 facing the liquid crystal layer LC and located on two opposite sides of the third main electrode M3, where a third gap g3 exists between the third main electrode M3 and one of the third sub electrodes S3, and another third gap g3 exists between the third main electrode M3 and the other one of the third sub electrodes S3. Specifically, a third gap g3 exists between the left side of the third main electrode M3 and the left third sub electrode S3, and another third gap g3 exists between the right side of the third main electrode M3 and the right third sub electrode S3. The fourth main electrode M4 is disposed on the surface 121 of the first substrate 12 facing the liquid crystal layer LC. The fourth sub electrodes S4 are disposed on the surface 121 of the first substrate 121 facing the liquid crystal layer LC and located on two opposite sides of the fourth main electrode M4, where a fourth gap g4 exists between the fourth main electrode M4 and one of the fourth sub electrodes S4, and another fourth gap g4 exists between the fourth main electrode M4 and the other one of the fourth sub electrodes S4. Specifically, a fourth gap g4 exists between the left side of the fourth main electrode M4 and the left fourth sub electrode S4, and another fourth gap g4 exists between the right side of the fourth main electrode M4 and the right fourth sub electrode S4. In the vertical projection direction Z, the third main electrode M3 overlaps the fourth main electrode M4, the third sub electrodes S3 overlap the fourth sub electrodes S4 respectively, and the third main electrode M3 partially overlaps the fourth sub electrodes S4 respectively. To be exact, one side (e.g. the left side) of the third main electrode M3 partially overlaps one of the fourth sub electrodes S4, and the other side (e.g. the right side) of the third main electrode M3 partially overlaps the other one of the fourth sub electrodes S4.

In this embodiment, the first substrate 12 and the second substrate 14 may include transparent substrates such as glass substrates, plastic substrates, plastic substrates or other suitable rigid or flexible substrates. The liquid crystal layer LC includes a plurality of liquid crystal molecules, which may be various types of positive or negative liquid crystal molecules. The material of the main electrodes and sub electrodes may include, but not limited to, transparent conductive materials such as indium tin oxide (ITO), indium zinc oxide (IZO), aluminum zinc oxide (AZO), aluminum indium oxide (AIO), gallium oxide (GaO), carbon nanotube (CNT), nano silver particle, metal having a thickness less than 60 nanometers, alloy having a thickness less than 60 nanometers, transparent organic conductive material or other suitable transparent conductive materials. In this embodiment, the electrodes on the first substrate 12 from left to right (or from right to left), for example, are one of the first sub electrodes S1 (namely the first one of the first sub electrodes S1), the first main electrode M1, the other one of the first sub electrodes S1 (namely the second one of the first sub electrodes S1), one of the fourth sub electrodes S4 (namely the first one of the fourth sub electrodes S4), the fourth main electrode M4, and the other one of the fourth sub electrodes S4 (namely the second one of the fourth sub electrodes S4), and no other electrodes (e.g. main electrode or sub electrode) are disposed between any two adjacent aforementioned electrodes. The electrodes on the second substrate 14 from left to right (or from right to left), for example, are one of the second sub electrodes S2 (namely the first one of the second sub electrodes S2), the second main electrode M2, the other one of the second sub electrodes S2 (namely the second one of the second sub electrodes S2), one of the third sub electrodes S3 (namely the first one of the third sub electrodes S3), the third main electrode M3 and the other one of the third sub electrodes S3 (namely the second one of the third sub electrodes S3), and no other electrodes (e.g. main electrode or sub electrode) are disposed between any two adjacent aforementioned electrodes. Preferably, there is no additional electrode (e.g. additional main electrode or additional sub electrode) between one of the first sub electrodes S1 and the first main electrode M1, the other one of the first sub electrodes S1 and the first main electrode M1, one of the fourth sub electrodes S4 and the fourth main electrode M4, and the other one of the fourth sub electrodes S4 and the fourth main electrode M4. Also, there is no additional electrode (e.g. additional main electrode or additional sub electrode) between one of the second sub electrodes S2 and the second main electrode M2, the other one of the second sub electrodes S2 and the second main electrode M2, one of the third sub electrodes S3 and the third main electrode M3, and the other one of the third sub electrodes S3 and the third main electrode M3.

The dimension (width, e.g. the width in the linear direction L) of the first liquid crystal lens unit 22 and the second liquid crystal lens unit 24 may be, for example, between about 250 micrometers and 500 micrometers, but not limited thereto. The Fresnel liquid crystal lens 10 may further include a first alignment film 26 and a second alignment film 28 configured to align the liquid crystal layer LC. The first alignment film 26 is disposed on the surface 121 of the first substrate 12 and covers the first main electrode M1, the first sub electrodes S1, the fourth main electrode M4 and the fourth sub electrodes S4; the second alignment film 28 is disposed on the surface 141 of the second substrate 14 and covers the second main electrode M2, the second sub electrodes S2, the third main electrode M3 and the third sub electrodes S3. The liquid crystal layer LC has a liquid crystal cell gap (namely liquid crystal thickness), which is approximately equal to the distance between the first alignment film 26 and the second alignment film 28. The liquid crystal cell gap is approximately between 1 micrometer and 50 micrometers, but not limited thereto.

In this embodiment, the dimension (width) of the first main electrode M1 is substantially equal to the dimension (width) of the third main electrode M3, the dimension (width) of the second main electrode M2 is substantially equal to the dimension (width) of the fourth main electrode M4, and the dimension (width) of the first main electrode M1 is larger than the dimension (width) of the second main electrode M2, but not limited thereto. In addition, the dimension (width) of each of the first sub electrodes S1 is substantially equal to the dimension (width) of each of the third sub electrodes S3, the dimension (width) of each of the second sub electrodes S2 is substantially equal to the dimension (width) of each of the fourth sub electrodes S4, and the dimension (width) of each of the first sub electrodes S1 is smaller than the dimension (width) of each of the second sub electrodes S2, but not limited thereto. Furthermore, the dimension (width) of the second main electrode M2 may be substantially equal to, greater than or less than the dimension (width) of the second sub electrode S2. The first gap g1 is substantially equal to the third gap g3, the second gap g2 is substantially equal to the fourth gap g4, and the first gap g1 is smaller than the second gap g2. The first gap g1, the second gap g2, the third gap g3 and the fourth gap g4 are all greater than 0 micrometer. For example, the dimension (width) of the second gap g2 and the fourth gap g4 is less than 50 micrometers and greater than 0 micrometer, but not limited thereto. Preferably, the dimension (width) of the second gap g2 and the fourth gap g4 is less than 30 micrometers and greater than 0 micrometer. More preferably, the dimension (width) of the second gap g2 and the fourth gap g4 is less than 20 micrometers and greater than 0 micrometer. Within the aforementioned range, the distribution of the phase retardation of liquid crystal molecules approximates to a parabolic curve. The dimension (width) of the first gap g1 and the third gap g3 is less than 10 micrometers and greater than 0 micrometer, but not limited thereto. Preferably, the dimension (width) of the first gap g1 and the third gap g3 is less than 5 micrometers and greater than 0 micrometer. More preferably, the dimension (width) of the first gap g1 and the third gap g3 is less than 3 micrometers and greater than 0 micrometer. Within the aforementioned range, the distribution of the phase retardation of liquid crystal molecules approximates to a parabolic curve.

In the vertical projection direction Z, one side (e.g. left side) of the first main electrode M1 and one of the second sub electrodes S2 and the other side (e.g. right side) of the first main electrode M1 and the other one of the second sub electrodes S2 have a first overlapping portion O1. The first overlapping portion O1 has a first overlapping width W1 substantially greater than 0 micrometer and less than or equal to 50 micrometers, preferably substantially greater than 0 micrometer and less than or equal to 30 micrometers, or preferably substantially greater than 0 micrometer and less than or equal to 10 micrometers, but not limited thereto. In the vertical projection direction Z, one side (e.g. left side) of the third main electrode M3 and one of the fourth sub electrodes S4 and the other side (e.g. right side) of the third main electrode M3 and the other one of the fourth sub electrodes S4 have a second overlapping portion O2. The second overlapping portion O2 has a second overlapping width W2 substantially greater than 0 micrometer and less than or equal to 50 micrometers, preferably substantially greater than 0 micrometer and less than or equal to 30 micrometers, or preferably substantially greater than 0 micrometer and less than or equal to 10 micrometers, but not limited thereto. In addition, in the vertical projection direction Z, one of the second sub electrodes S2 and one of the fourth sub electrodes S4 may have a third overlapping portion O3. The third overlapping portion O3 has a third overlapping width W3 substantially greater than 0 micrometer and less than or equal to 50 micrometers, preferably substantially greater than 0 micrometer and less than or equal to 30 micrometers, or preferably substantially greater than 0 micrometer and less than or equal to 10 micrometers, but not limited thereto.

When driving the Fresnel liquid crystal lens 10, the first main electrode M1 has a first voltage V1, the first sub electrodes S1 have a second voltage V2, the second main electrode M2 has a third voltage V3, the second sub electrodes S2 have a fourth voltage V4, the third main electrode M3 has a fifth voltage V5, the third sub electrodes S3 have a sixth voltage V6, the fourth main electrode M4 has a seventh voltage V7, and the fourth sub electrodes S4 have an eighth voltage V8. The polarity of the second voltage V2, the fourth voltage V4, the fifth voltage V5 and the seventh voltage V7 may be opposite to (namely contrary to) the polarity of the first voltage V1, the third voltage V3, the sixth voltage V6 and the eighth voltage V8. In addition, the first main electrode M1 and the second main electrode M2 have a first voltage difference (i.e. the voltage difference between the first voltage V1 and the third voltage V3), the first main electrode M1 and the second sub electrode S2 have a second voltage difference (i.e. the voltage difference between the first voltage V1 and the fourth voltage V4), where the absolute value of the first voltage difference is less than the absolute value of the second voltage difference, and the voltage difference between the first sub electrode S1 and the second sub electrode S2 is substantially equal to 0 (i.e. the second voltage V2 is substantially equal to the fourth voltage V4). The third main electrode M3 and the fourth main electrode M4 have a third voltage difference (i.e. the voltage difference between the fifth voltage V5 and the seventh voltage V7), the third main electrode M3 and the fourth sub electrode S4 have a fourth voltage difference (i.e. the voltage difference between the fifth voltage V5 and the eighth voltage V8), where the absolute value of the third voltage difference is less than the absolute value of the fourth voltage difference, and the voltage difference between the third sub electrode S3 and the fourth sub electrode S4 is substantially equal to 0 (i.e. the sixth voltage V6 is substantially equal to the eighth voltage V8). In this embodiment, for example, the value of the first voltage V1, the sixth voltage V6 and the eighth voltage V8 is a predetermined positive voltage value "+V", the value of the second voltage V2, the fourth voltage V4 and the fifth voltage V5 is a predetermined negative voltage value "−V", the value of the third voltage V3 is equal to a predetermined voltage value minus a differential voltage value "(V−dV)", which is positive, and the value of the seventh voltage V7 is equal to a predetermined voltage value minus a differential voltage value "−(V−dV)", which is negative. For example, the predetermined voltage value is about 2.5 V, and the differential voltage value is between about 0.8 V and 1.4V. Accordingly, the value of the first voltage V1, the sixth voltage V6 and the eighth voltage V8 is +2.5V, the value of the second voltage V2, the fourth voltage V4 and the fifth voltage V5 is −2.5V, the value of the third voltage V3 is between about 1.1V and 1.7V, and the seventh voltage V7 is between about −1.1V and −1.7V. Therefore, the absolute value of the first voltage difference (i.e. the differential voltage value dV) is substantially between about 0.8 V and 1.4V, and the absolute value of the second voltage difference is substantially about 5V, but not limited thereto. The absolute value of the third voltage difference is substantially between about 0.8 V and 1.4V, and the absolute value of the fourth voltage difference is substantially about 5V, but not limited thereto.

In this embodiment, the absolute value of the second voltage difference between the first main electrode M1 and the second sub electrode S2 is substantially greater than the absolute value of the first voltage difference between the first main electrode M1 and the second main electrode M2, that is to say, the first overlapping portion O1 of the first main electrode M1 and the second sub electrode S2 has the strongest vertical electrical field, and the vertical electrical field becomes weaker when getting closer to the central position of the first main electrode M1 or the second main electrode M2. Thus, under the aforementioned vertical electrical field profile, the distribution of the phase retardation of the liquid crystal molecules in the liquid crystal layer LC approximates to that of a real optical lens. Also, the vertical electrical field becomes weaker when getting closer to the central position of each first sub electrode S1 and the corresponding second sub electrode S2. Thus, under the aforementioned vertical electrical field profile, the distribution of the phase retardation of the liquid crystal molecules in the liquid crystal layer LC approximates to that of two real optical lenses. By virtue of the aforementioned arrangement and driving voltage, the first liquid crystal lens unit 22 is able to provide a lenticular effect similar to that of a real Fresnel lens. Similarly, the absolute value of the fourth voltage difference between the third main electrode M3 and the fourth sub electrode S4 is substantially greater than the absolute value of the third voltage difference between the third main electrode M3 and the fourth main electrode M4, that is to say, the second overlapping portion O2 of the third main electrode M3 and the fourth sub electrode S4 has the strongest vertical electrical field, and the vertical electrical field becomes weaker when getting closer to the central position of the third main electrode M3 or the fourth main electrode M4. Thus, under the aforementioned vertical electrical field profile, the distribution of the phase retardation of the liquid crystal molecules in the liquid crystal layer LC approximates to that of a real optical lens. Also, the vertical electrical field becomes weaker when getting closer to the central position of each third sub electrode S3 and the corresponding fourth sub electrode S4. Thus, under the aforementioned vertical electrical field profile, the distribution of the phase retardation of the liquid crystal molecules in the liquid crystal layer LC approximates to that of two real optical lenses. By virtue of the aforementioned arrangement and driving voltage, the second liquid crystal lens unit 24 is able to provide a lenticular effect similar to that of a real Fresnel lens. In addition, the first overlapping width W1 of the first overlapping portion O1, the second overlapping width W2 of the second overlapping portion O2 and the third overlapping width W3 of the third overlapping portion O3 are influential factors to the depth of valley (lowest point) and the width of the phase retardation distribution, and thus the dimension of the aforementioned overlapping portions may be modified based on the requirement and specification of the desired lenticular effect.

Figure 2:
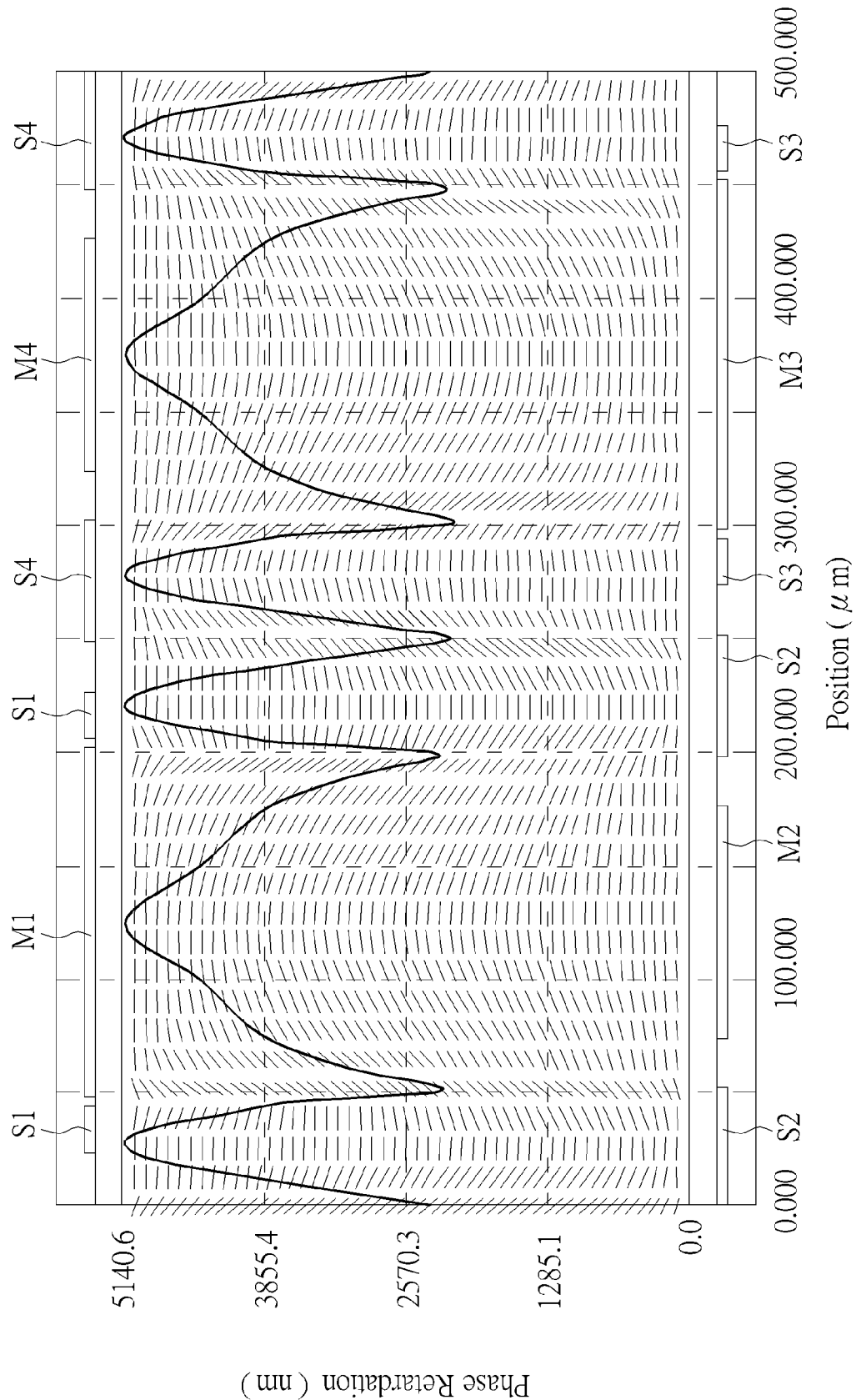
FIGS. 2-8 illustrate simulation results of phase retardation distribution of the Fresnel liquid crystal lens of FIG. 1 when driven by different driving voltages.
Figure 3:
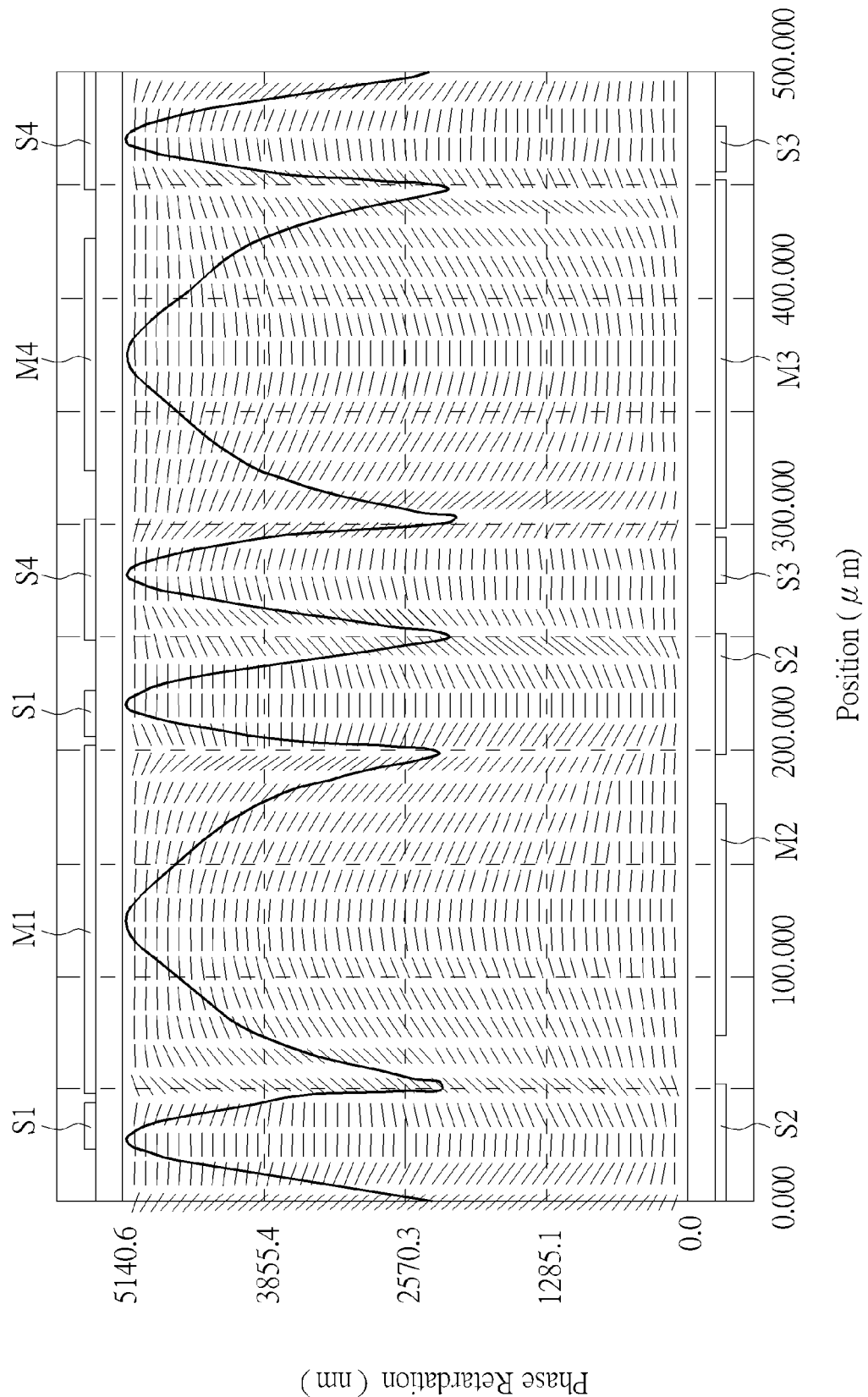
Figure 4:
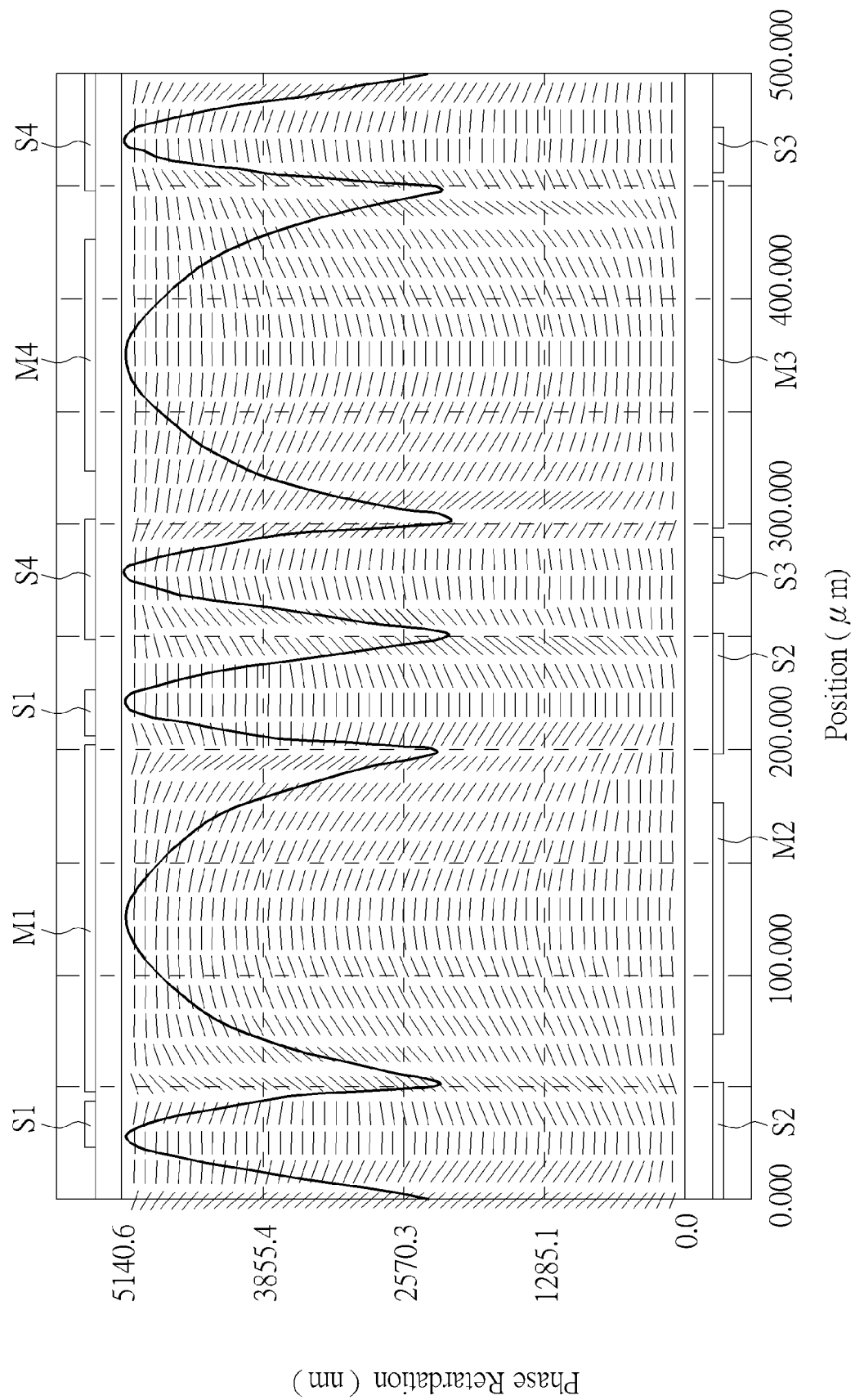

Refer to FIGS. 2-8, as well as FIG. 1. FIGS. 2-8 respectively illustrate simulation results of phase retardation distribution of the Fresnel liquid crystal lens of FIG. 1 when driven by different driving voltages, where the X-Coordinate represents the position in the linear direction L (unit: micrometer (μm)), and the Y-Coordinate represents the phase retardation of liquid crystal molecules (unit: nanometer (nm)). The simulation results of FIGS. 2-8 are obtained on the following conditions. The width of the first liquid crystal lens unit 22 and the second liquid crystal lens unit 24 is about 250 micrometers, the liquid crystal cell gap is about 20 micrometers, the dimension (width) of the first main electrode M1 and the third main electrode M3 is about 150 micrometers, the dimension (width) of the second main electrode M2 and the fourth main electrode M4 is about 100 micrometers, the dimension (width) of the first sub electrode S1 and the third sub electrode S3 is about 20 micrometers, the dimension (width) of the second sub electrode S2 and the fourth sub electrode S4 is about 50 micrometers, the dimension of the first gap g1 and the third gap g3 is about 5 micrometers, the dimension of the second gap g2 and the fourth gap g4 is about 25 micrometers, the first overlapping width W1 is about 2 micrometers, the second overlapping width W2 is about 2 micrometers and the third overlapping width W3 is about 2 micrometers. In addition, the value of the first voltage V1, the sixth voltage V6 and the eighth voltage V8 is +2.5V, and the value of the second voltage V2, the fourth voltage V4 and the fifth voltage V5 is −2.5V. The simulation results of FIGS. 2-8 are obtained at different third voltage V3 and different seventh voltage V7. In the simulation of FIG. 2, the third voltage V3 is about 1.7V, and the seventh voltage V7 is about −1.7V; in the simulation of FIG. 3, the third voltage V3 is about 1.6V, and the seventh voltage V7 is about −1.6V; in the simulation of FIG. 4, the third voltage V3 is about 1.5V, and the seventh voltage V7 is about −1.5V; in the simulation of FIG. 5, the third voltage V3 is about 1.4V, and the seventh voltage V7 is about −1.4V; in the simulation of FIG. 6, the third voltage V3 is about 1.3V, and the seventh voltage V7 is about −1.3V; in the simulation of FIG. 7, the third voltage V3 is about 1.2V, and the seventh voltage V7 is about −1.2V; and in the simulation of FIG. 8, the third voltage V3 is about 1.1V, and the seventh voltage V7 is about −1.1V. As shown in FIGS. 2-8, the phase retardation distribution of the Fresnel liquid crystal lens 10 approximates to the lenticular effect of a real Fresnel lens under the aforementioned conditions. Particularly when the third voltage V3 is about 1.4V and the seventh voltage V7 is about −1.4V (the simulation in FIG. 5), the phase retardation distribution of the Fresnel liquid crystal lens 10 is similar to a parabolic curve, which is substantially equal to the lenticular effect of a real Fresnel lens.

Refer to Table 1. Table 1 lists several configurations of the voltage values "+V", "dV" and "(V−dV)".

TABLE 1

| V(volts) | dV(volts) | | V − dV(volts) |
|---|---|---|---|
| 1 | 0 | Acceptable value for | 1 |
|  | 0 | dV | 1 |
|  | 0 |  | 1 |
| 1.5 | 0 | Acceptable minimum value for dV | 1.5 |
|  | 0.1 | Most appropriate value for dV | 1.4 |
|  | 1 | Acceptable maximum value for dV | 0.5 |
| 2 | 0.3 | Acceptable minimum value for dV | 1.7 |
|  | 0.6 | Most appropriate value for dV | 1.4 |
|  | 1.5 | Acceptable maximum value for dV | 0.5 |
| 2.5 | 0.8 | Acceptable minimum value for dV | 1.7 |
|  | 1.1 | Most appropriate value for dV | 1.4 |
|  | 2 | Acceptable maximum value for dV | 0.5 |
| 3 | 1.3 | Acceptable minimum value for dV | 1.7 |
|  | 1.6 | Most appropriate value for dV | 1.4 |
|  | 2.5 | Acceptable maximum value for dV | 0.5 |
| 3.5 | 1.8 | Acceptable minimum value for dV | 1.7 |
|  | 2.1 | Most appropriate value for dV | 1.4 |
|  | 3 | Acceptable maximum value for dV | 0.5 |

Figure 5:
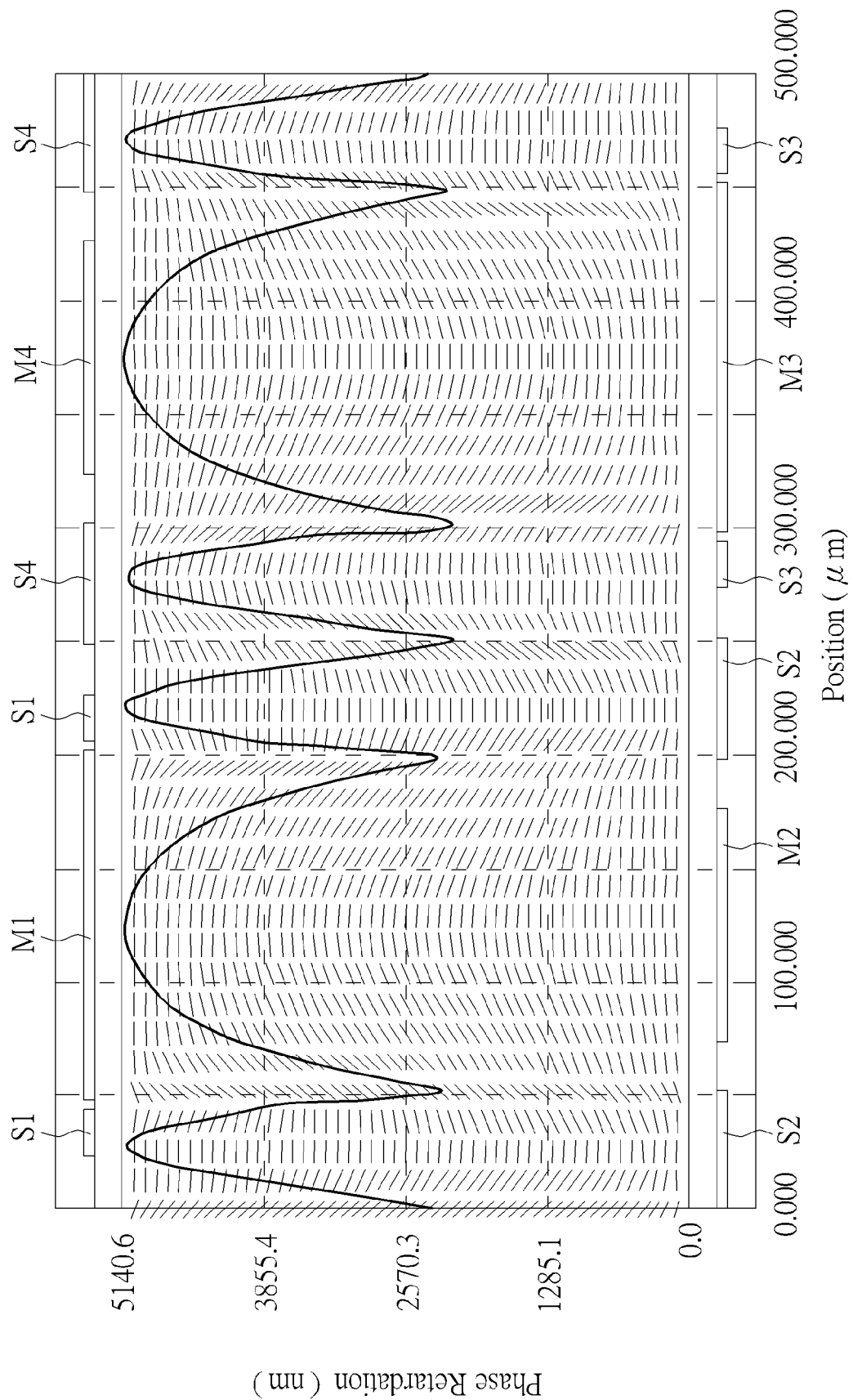
Figure 6:
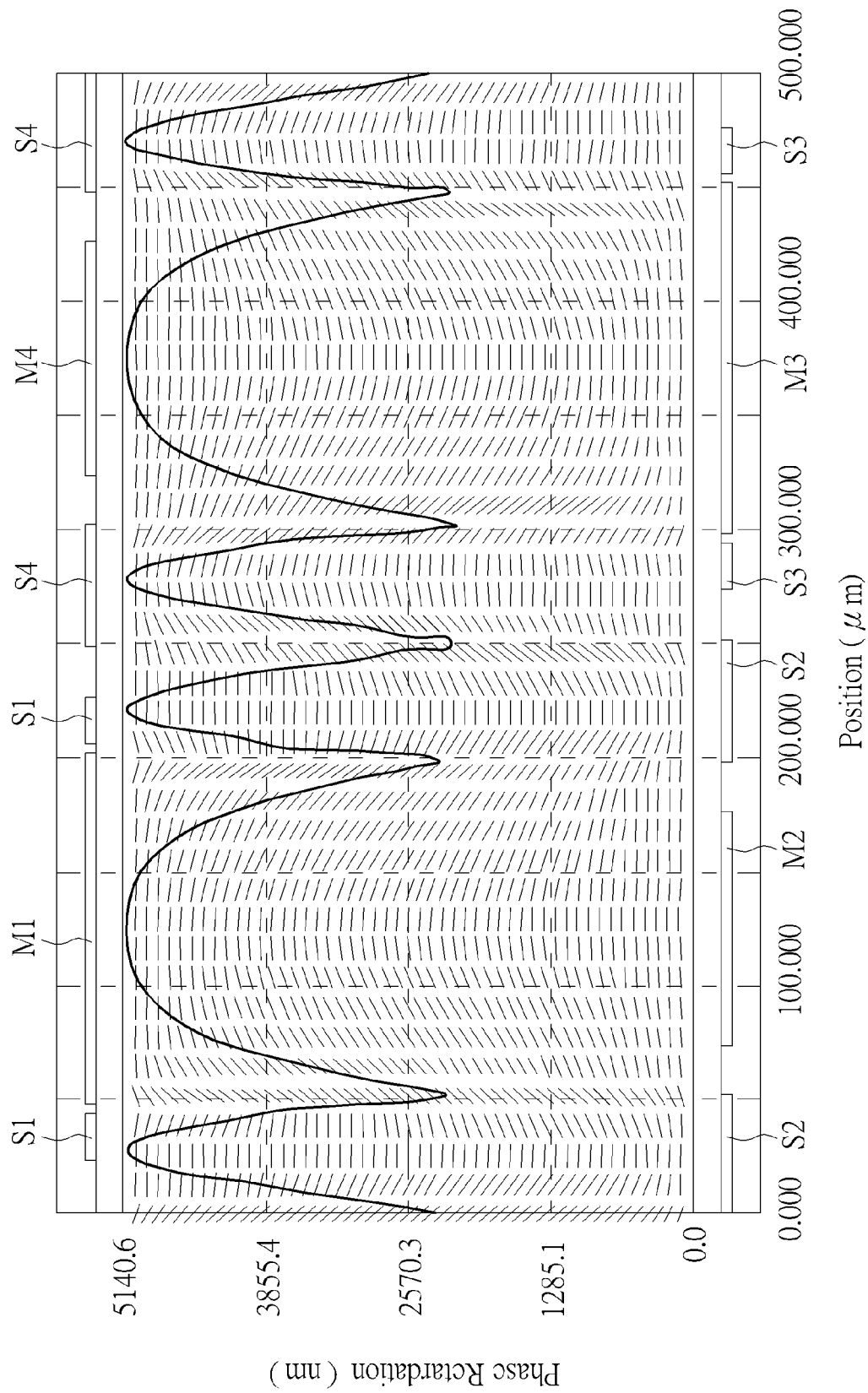
Figure 7:
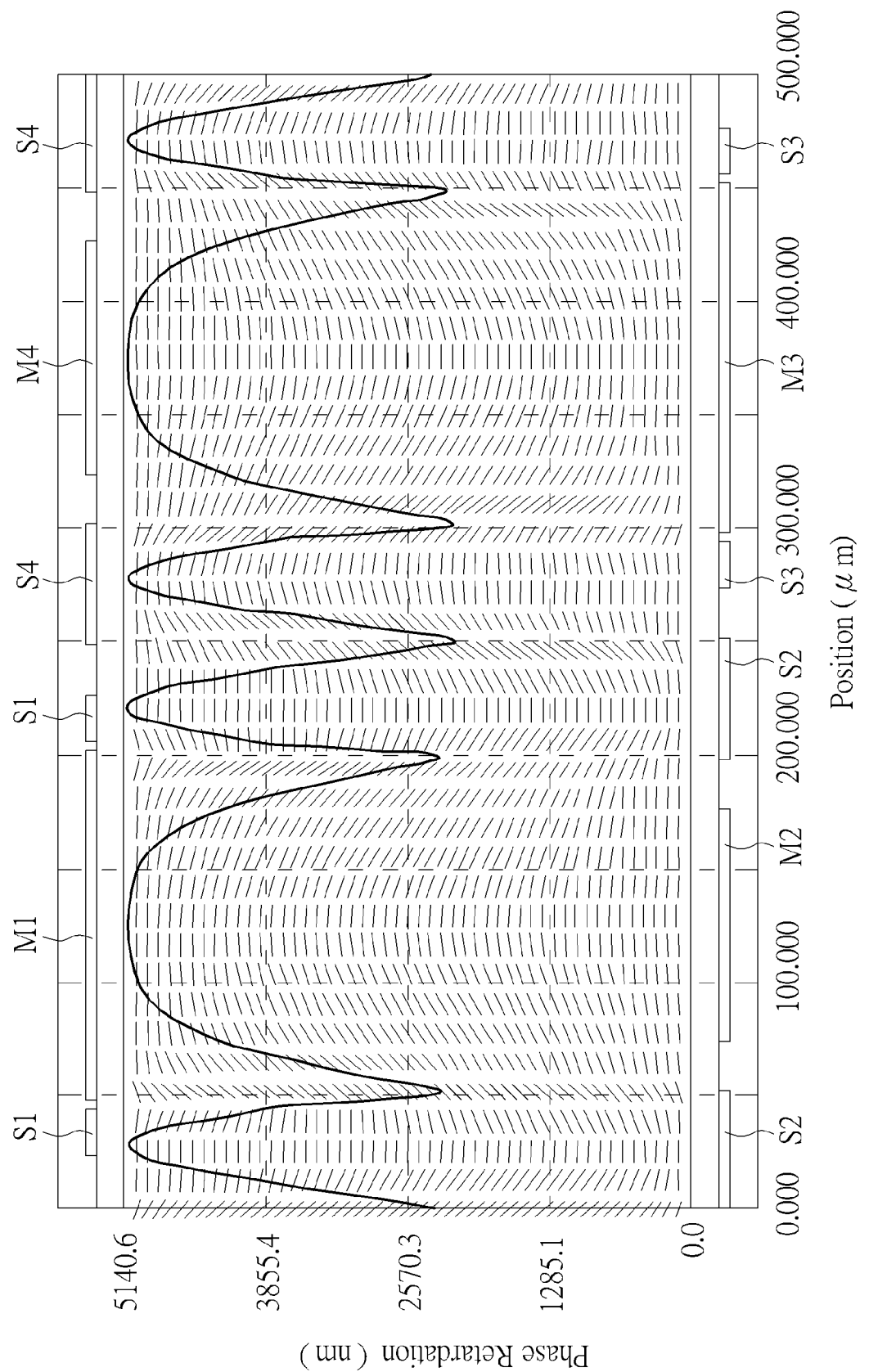
Figure 8:
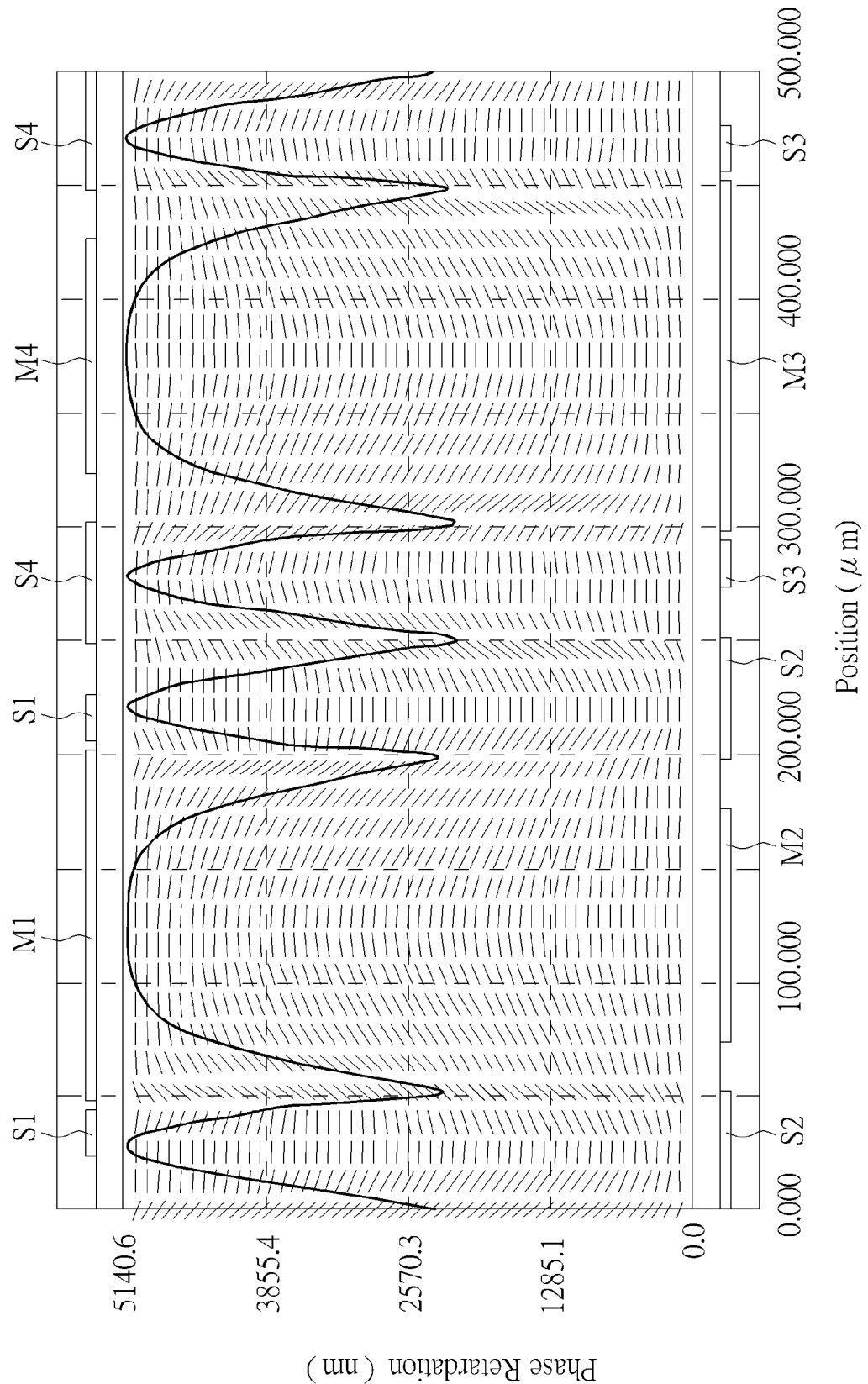

As evidenced by Table 1, a most appropriate value for dV (differential voltage value) can be obtained at varied voltage value "V" (variedly predetermined voltage value). For example, when the voltage value "V" is about 2.5V, the differential voltage value "dV" is about 1.1V (i.e. (V−dV) =1.4V), the Fresnel liquid crystal lens has the optimal phase retardation distribution as shown in FIG. 5. It can be seen from FIGS. 2-8 and Table 1 that the Fresnel liquid crystal lens has the optimal phase retardation distribution when V−dV=1.4 (i.e. dV=V−1.4 or V=dV+1.4), where "V" is not equal to 0V, and "dV" is approximately greater than or equal to 0V and less than 3V. The configuration of the voltage values "+V", "dV" and "(V−dV)" is not limited by Table 1, and may be modified based on different electrode arrangement. It is noted that the relation "V−dV=1.4" is preferably, but not limited to be, fulfilled.

The Fresnel liquid crystal lens is not limited by the aforementioned embodiment, and the Fresnel liquid crystal lens and 2D/3D switchable display panel may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 9:
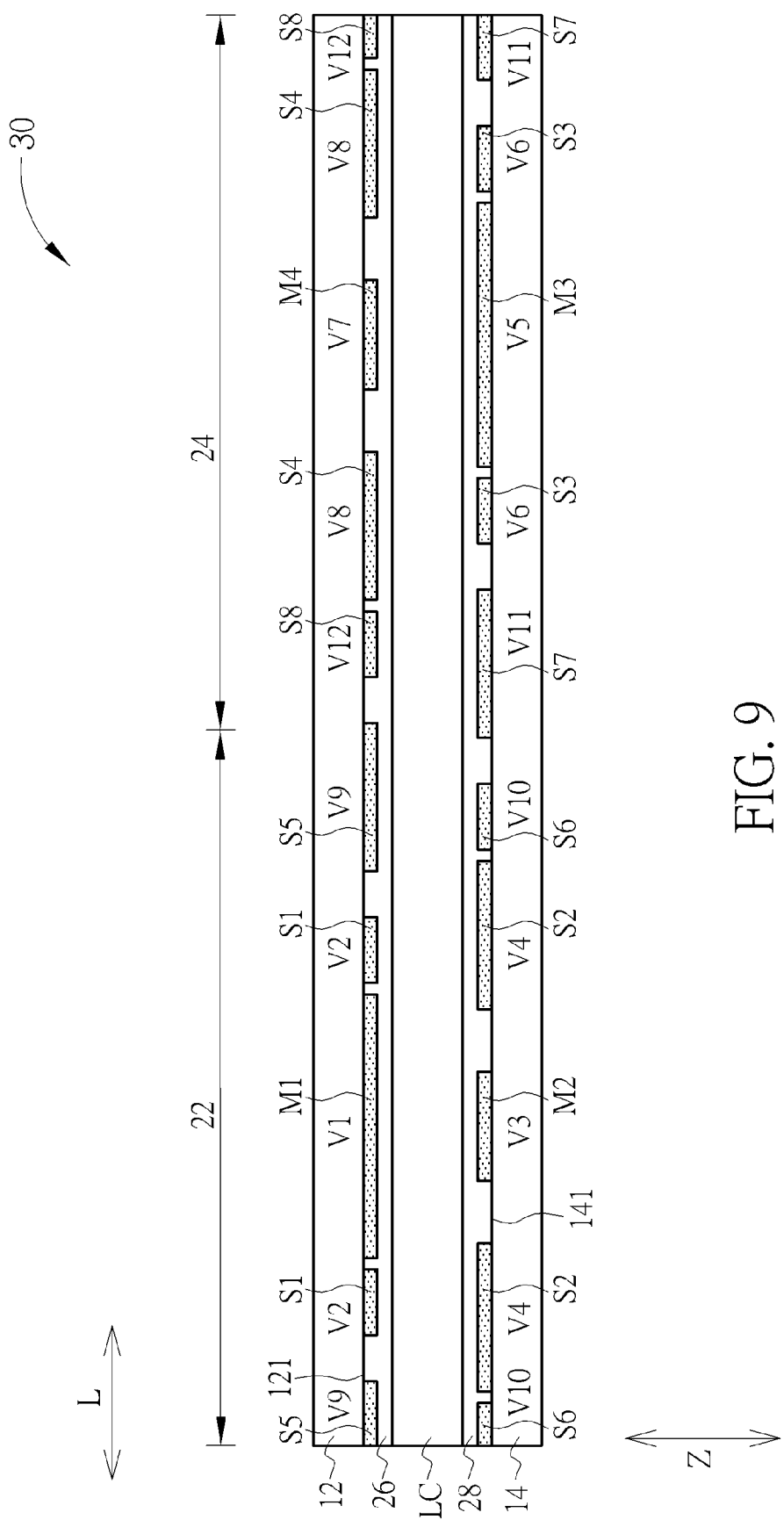
FIG. 9 is a schematic diagram illustrating a Fresnel liquid crystal lens according to a second embodiment of the present disclosure.

Refer to FIG. 9. FIG. 9 is a schematic diagram illustrating a Fresnel liquid crystal lens according to a second embodiment of the present disclosure. As shown in FIG. 9, different from the first embodiment, in the Fresnel liquid crystal lens 30 of the second embodiment, each of the first liquid crystal lens units 22 further comprises at least two fifth sub electrodes S5 and at least two sixth sub electrodes S6, where the fifth sub electrodes S5 are disposed on the surface 121 of the first substrate 12 facing the liquid crystal layer LC and located on two opposite sides of the first sub electrodes S1 with respect to the first main electrode M1, and the sixth sub electrodes S6 are disposed on the surface 141 of the second substrate 14 facing the liquid crystal layer LC and located on two opposite sides of the second sub electrodes S2 with respect to the second main electrode M2. In other words, the fifth sub electrodes S5 are located on two outer sides of the first sub electrodes S1 respectively, i.e. one of the fifth sub electrodes S5 (e.g. the left fifth sub electrode S5 in FIG. 9) is located on the outer side of one of the first sub electrodes S1, and the other one of the fifth sub electrodes S5 (e.g. the right fifth sub electrode S5 in FIG. 9) is located on the outer side of the other one of the first sub electrodes S1; the sixth sub electrodes S6 are located on two outer sides of the second sub electrodes S2 respectively, i.e. one of sixth sub electrodes S6 (e.g. the left sixth sub electrode S6 in FIG. 9) is located on the outer side of one of the second sub electrodes S2, and the other one of sixth sub electrodes S6 (e.g. the right sixth sub electrode S6 in FIG. 9) is located on the outer side of the other one of the second sub electrodes S2. Each of the second liquid crystal lens units 24 further comprises at least two seventh sub electrodes S7 and at least two eighth sub electrodes S8, where the seventh sub electrodes S7 are disposed on the surface 141 of the second substrate 14 facing the liquid crystal layer LC and located on two opposite sides of the third sub electrodes S3 with respect to the third main electrode M3, and the eighth sub electrodes S8 are disposed on the surface 121 of the first substrate 12 facing the liquid crystal layer LC and located on two opposite sides of the fourth sub electrodes S4 with respect to the fourth main electrode M4. In other words, the seventh sub electrodes S7 are located on two outer sides of the third sub electrodes S3 respectively, i.e. one of the seventh sub electrodes S7 (e.g. the left seventh sub electrode S7 in FIG. 9) is located on the outer side of one of the third sub electrodes S3, and the other one of the seventh sub electrodes S7 (e.g. the right seventh sub electrode S7 in FIG. 9) is located on the outer side of the other one of the third sub electrodes S3; the eighth sub electrodes S8 are located on two outer sides of the fourth sub electrodes S4 respectively, i.e. one of the eighth sub electrodes S8 (e.g. the left eighth sub electrode S8 in FIG. 9) is located on the outer side of one of the fourth sub electrodes S4, and the other one of the eighth sub electrodes S8 (e.g. the right eighth sub electrode S8 in FIG. 9) is located on the outer side of the other one of the fourth sub electrodes S4. In other embodiment, the Fresnel liquid crystal lens has only one fifth sub electrode S5, only one sixth sub electrode S6, only one seventh sub electrode S7, only one eighth sub electrode S8, and wherein the only one fifth sub electrode S5 is located between one of the first sub electrodes S1 (e.g. the right first sub electrode S1 in FIG. 9) and one of the fourth sub electrodes S4 (e.g. the left fourth sub electrode S4 in FIG. 9), the only one sixth sub electrode S6 is located between one of the second sub electrodes S2 (e.g. the right second sub electrode S2 in FIG. 9) and one of the third sub electrodes S3 (e.g. the left third sub electrode S3 in FIG. 9), the only one eighth sub electrode S8 is located between the only one fifth sub electrode S5 and one of the fourth sub electrodes S4 (e.g. the left fourth sub electrode S4 in FIG. 9), and the only one seventh sub electrode S7 is located between the only one sixth sub electrodes S6 and one of the third sub electrodes S3 (e.g. the left third sub electrodes S3 in FIG. 9). In other words, there is no fifth sub electrode S5 adjacent to the left first sub electrode S1 in FIG. 9, there is no sixth sub electrode S6 adjacent to the left second sub electrode S2 in FIG. 9, there is no eighth sub electrode S8 adjacent to the right fourth sub electrode S4, and there is no seventh sub electrode S7 adjacent to the right third sub electrode S3, so that each one of the first liquid crystal lens unit 22 or each of the second liquid crystal lens unit 24 has four pairs of electrodes.

The dimension (width) of each of the fifth sub electrodes S5 is substantially equal to the dimension (width) of each of the seventh sub electrodes S7, the dimension (width) of each of the sixth sub electrodes S6 is substantially equal to the dimension (width) of each of the eighth sub electrodes S9, and the dimension (width) of each of the sixth sub electrodes S6 is smaller than the dimension (width) of each of the fifth sub electrodes S5, but not limited thereto. The dimension (width) of each of the fifth sub electrodes S5 may be substantially equal to the dimension (width) of each of the second sub electrodes S2, and the dimension (width) of each of the sixth sub electrodes S6 may be substantially equal to the dimension (width) of each of the first sub electrodes S1, but not limited thereto. In the vertical projection direction Z, the fifth sub electrode S5 overlaps the sixth sub electrode S6, the fifth sub electrode S5 overlaps the second sub electrode S2 and the seventh sub electrode S7, the seventh sub electrode S7 overlaps the eighth sub electrode S8, and the seventh sub electrode S7 partially overlaps the fourth sub electrode S4 and the fifth sub electrode S5.

The electrodes on the first substrate 12 from left to right (or from right to left), for example, are one of the fifth sub electrodes S5 (namely the first one of the fifth sub electrodes S5), one of the first sub electrodes S1 (namely the first one of the first sub electrodes S1), the first main electrode M1, the other one of the first sub electrodes S1 (namely the second one of the first sub electrodes S1), the other one of the fifth sub electrodes S5 (namely the second one of the fifth sub electrodes S5), one of the eighth sub electrodes S8 (namely the first one of the eighth sub electrodes S8), one of the fourth sub electrodes S4 (namely the first one of the fourth sub electrodes S4), the fourth main electrode M4, the other one of the fourth sub electrodes S4 (namely the second one of the fourth sub electrodes S4) and the other one of the eighth sub electrodes S8 (namely the second one of the eighth sub electrodes S8), and no other electrodes (e.g. main electrode or sub electrode) are disposed between any two adjacent aforementioned electrodes. The electrodes on the second substrate 14 from left to right (or from right to left), for example, are one of the sixth sub electrodes S6 (namely the first one of the sixth sub electrodes S6), one of the second sub electrodes S2 (namely the first one of the second sub electrodes S2), the second main electrode M2, the other one of the second sub electrodes S2 (namely the second one of the second sub electrodes S2), the other one of the sixth sub electrodes S6 (namely the second one of the sixth sub electrodes S6), one of the seventh sub electrodes S7 (namely the first one of the seventh sub electrodes S7), one of the third sub electrodes S3 (namely the first one of the third sub electrodes S3), the third main electrode M3, the other one of the third sub electrodes S3 (namely the second one of the third sub electrodes S3) and the other one of the seventh sub electrodes S7 (namely the second one of the seventh sub electrodes S7), and no other electrodes (e.g. main electrode or sub electrode) are disposed between any two adjacent aforementioned electrodes. Preferably, there is no additional electrode (e.g. additional main electrode or additional sub electrode) between one of the fifth sub electrodes S5 (namely the first one of the fifth sub electrodes S5) and one of the first sub electrodes S1 (namely the first one of the first sub electrodes S1), the other one of the fifth sub electrodes S5 (namely the second one of the fifth sub electrodes S5) and the other one of the first sub electrodes S1 (namely the second one of the first sub electrodes S1), one of the eighth sub electrodes S8 (namely the first one of the eighth sub electrodes S8) and one of the fourth sub electrodes S4 (namely the first one of the fourth sub electrodes S4), the other one of the eighth sub electrodes S8 (namely the second one of the eighth sub electrodes S8) and the other one of the fourth sub electrodes S4 (namely the second one of the fourth sub electrodes S4), one of the sixth sub electrodes S6 (namely the first one of the sixth sub electrodes S6) and one of the second sub electrodes S2 (namely the first one of the second sub electrodes S2), the other one of the sixth sub electrodes S6 (namely the second one of the sixth sub electrodes S6) and the other one of the second sub electrodes S2 (namely the second one of the second sub electrodes S2), one of the seventh sub electrodes S7 (namely the first one of the seventh sub electrodes S7) and one of the third sub electrodes S3 (namely the first one of the third sub electrodes S3), and the other one of the seventh sub electrodes S7 (namely the second one of the seventh sub electrodes S7) and the other one of the third sub electrodes S3 (namely the second one of the third sub electrodes S3). In addition, there is no additional electrode (e.g. additional main electrode or additional sub electrode) between each of the first sub electrodes S1 and the first main electrode M1, each of the fourth sub electrodes S4 and the fourth main electrode M4, each of the second sub electrodes S2 and the second main electrode M2 and each of the third sub electrodes S3 and the third main electrode M3 as disclosed in the first embodiment.

When driving the Fresnel liquid crystal lens 30, the first main electrode M1 has a first voltage V1, the first sub electrodes S1 have a second voltage V2, the second main electrode M2 has a third voltage V3, the second sub electrodes S2 have a fourth voltage V4, the third main electrode M3 has a fifth voltage V5, the third sub electrodes S3 have a sixth voltage V6, the fourth main electrode M4 has a seventh voltage V7, the fourth sub electrodes S4 have an eighth voltage V8, the fifth sub electrodes S5 have a ninth voltage V9, the sixth sub electrodes S6 have a tenth voltage V10, the seventh sub electrodes S7 have an eleventh voltage V11, and the eighth sub electrodes S8 have a twelfth voltage V12. The polarity of the second voltage V2, the fourth voltage V4, the fifth voltage V5, the seventh voltage V7, the eleventh voltage V11 and the twelfth voltage V12 may be opposite to (namely contrary to) the polarity of the first voltage V1, the third voltage V3, the sixth voltage V6, the eighth voltage V8, the ninth voltage V9 and the tenth voltage V10. The ninth voltage V9 is substantially equal to the first voltage V1, the tenth voltage V10 is substantially equal to the first voltage V1, the eleventh voltage V11 is substantially equal to the fifth voltage V5 and the twelfth voltage V12 is substantially equal to the fifth voltage V5, but not limited thereto. In addition, the fifth sub electrode S5 and the second sub electrode S2 have a fifth voltage difference (i.e. the voltage difference between the ninth voltage V9 and the fourth voltage V4), the seventh sub electrode S7 and the fifth sub electrode S5 have a sixth voltage difference (i.e. the voltage difference between the eleventh voltage V11 and the ninth voltage V9), the seventh sub electrode S7 and the fourth sub electrode S4 have a seventh voltage difference (i.e. the voltage difference between the eleventh voltage V11 and the eighth voltage V8). The absolute value of the fifth voltage difference is substantially equal to the absolute value of the sixth voltage difference, the absolute value of the fifth voltage difference is substantially equal to the absolute value of the seventh voltage difference, the voltage difference between the fifth sub electrode S5 and the sixth sub electrode S6 is substantially equal to 0 (i.e. the ninth voltage V9 is substantially equal to the tenth voltage V10), and the voltage difference between the seventh sub electrode S7 and the eighth sub electrode S8 is substantially equal to 0 (i.e. the eleventh voltage V11 is substantially equal to the twelfth voltage V12).

In this embodiment, for example, the value of the first voltage V1, the sixth voltage V6, the eighth voltage V8, the ninth voltage V9 and the tenth voltage V10 is a predetermined positive voltage value "+V", the value of the second voltage V2, the fourth voltage V4, the fifth voltage V5, the eleventh voltage V11 and the twelfth voltage V12 is a predetermined negative voltage value "−V", the value of the third voltage V3 is equal to a predetermined voltage value minus a differential voltage value "(V−dV)", which is positive, and the value of the seventh voltage V7 is equal to a predetermined voltage value minus a differential voltage value "−(V−dV)", which is negative. For example, the predetermined voltage value is about 2.5 V, and the differential voltage value is between about 0.8 V and 1.4V. Accordingly, the value of the first voltage V1, the sixth voltage V6, the eighth voltage V8, the ninth voltage V9 and the tenth voltage V10 is +2.5V, the value of the second voltage V2, the fourth voltage V4, the fifth voltage V5, the eleventh voltage V11 and the twelfth voltage V12 is −2.5V, the value of the third voltage V3 is between about 1.1V and 1.7V, and the seventh voltage V7 is between about −1.1V and −1.7V. Therefore, the absolute value of the first voltage difference (i.e. the differential voltage value dV) is substantially between about 0.8 V and 1.4V, and the absolute value of the second voltage difference is substantially about 5V, but not limited thereto. The absolute value of the third voltage difference is substantially between about 0.8 V and 1.4V, and the absolute value of the fourth voltage difference is substantially about 5V, but not limited thereto. The absolute value of the fifth voltage difference is substantially about 5V, the absolute value of the sixth voltage difference is substantially about 5V, the absolute value of the seven voltage difference is substantially about 5V, but not limited thereto. To provide the Fresnel liquid crystal lens with the optimal phase retardation distribution, the configuration of the voltage values "+V", "dV" and "(V−dV)" may be referred to that of the first embodiment. For example, V−dV=1.4 (i.e. dV=V−1.4 or V=dV+1.4), where "V" is not equal to 0V, and "dV" is approximately greater than or equal to 0V and less than 3V. The configuration of the voltage values "+V", "dV" and "(V−dV)" is not limited by Table 1, and may be modified based on different electrode arrangement.

Figure 10:
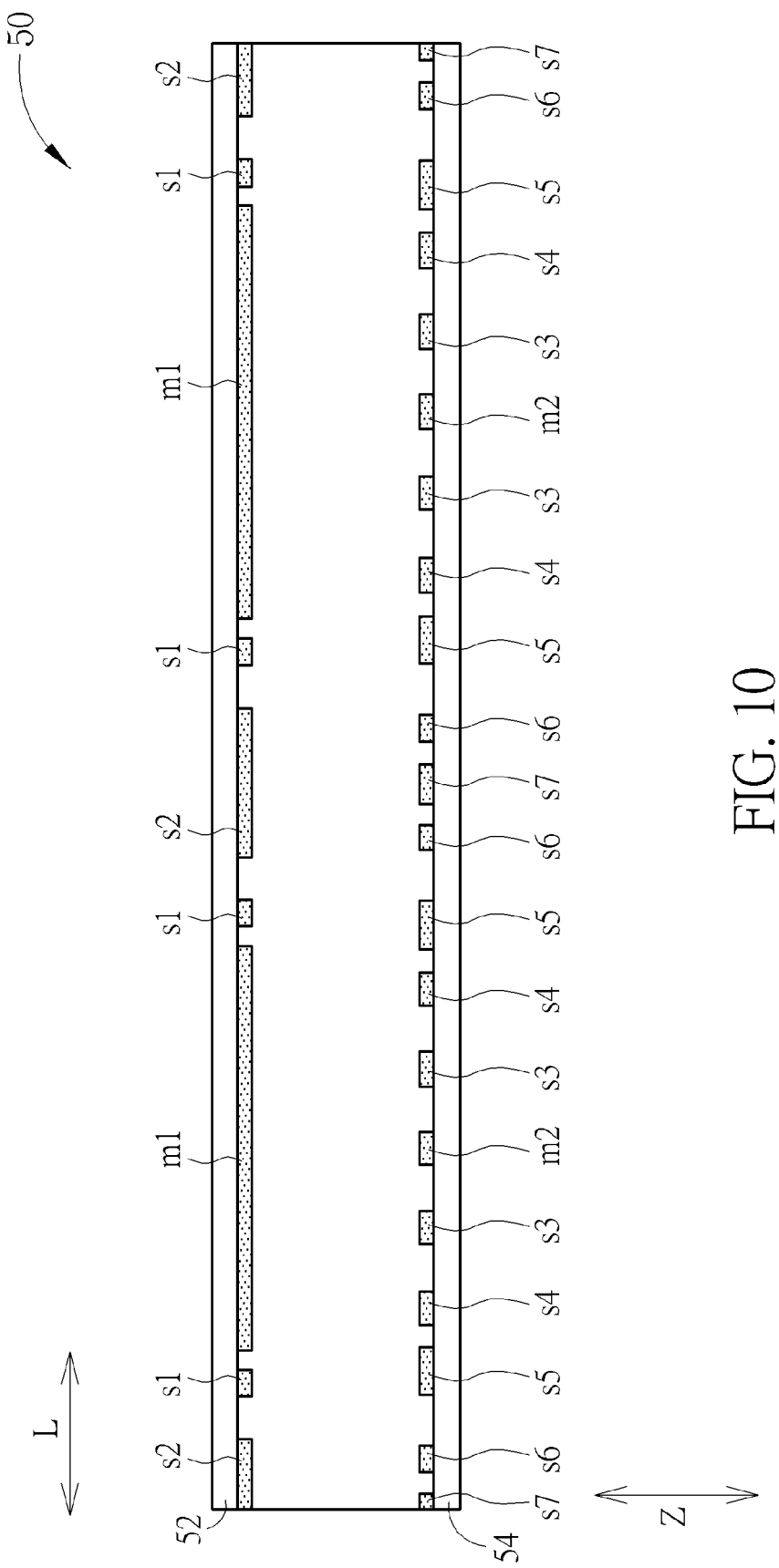
FIG. 10 is a schematic diagram illustrating a Fresnel liquid crystal lens according to a comparative embodiment of the present disclosure.

Refer to FIG. 10. FIG. 10 is a schematic diagram illustrating a Fresnel liquid crystal lens according to a comparative embodiment of the present disclosure. As shown in FIG. 10, the Fresnel liquid crystal lens 50 of the comparative embodiment includes a first substrate 52, a second substrate 54, a liquid crystal layer LC and a plurality of liquid crystal lens units 60. Each of the liquid crystal lens units 60 includes a first main electrode m1, two first sub electrodes s1 and two second sub electrodes s2 disposed on the first substrate 52, and a second main electrode m2, two third sub electrodes s3, two fourth sub electrodes s4, two fifth sub electrodes s5, two sixth sub electrodes s6 and two seventh sub electrodes s7 disposed on the second substrate 54. The first main electrode m1 only entirely overlaps the second main electrode m2, the third sub electrodes s3 and the fourth sub electrodes s4, each of the first sub electrodes s1 only entirely overlaps the corresponding fifth sub electrodes s5 respectively, and each of the second sub electrodes s2 only entirely overlaps the corresponding sixth sub electrodes s6 and the corresponding seventh sub electrode s7 respectively. The fifth sub electrode s5, the sixth sub electrode s6 and the seventh sub electrode s7 do not overlap the first main electrode m1, the second sub electrode s2 does not overlap the fifth sub electrode s5, and the sixth sub electrode s6 and the seventh sub electrode s7 do not overlap the first sub electrode s1.

When driving the Fresnel liquid crystal lens 50, the voltage value of the first main electrode m1, the first sub electrodes s1, the second sub electrodes s2 and the second main electrode m2 is 0V, the voltage value of the third sub electrodes s3 is about 1.4V, the voltage value of the fourth sub electrodes S4 is about 2V, the voltage value of the fifth sub electrodes s5 is about 3.3V, the voltage value of the sixth sub electrodes s6 is about 6.6V, and the voltage value of the seventh sub electrodes s7 is about 10V.

Figure 11:
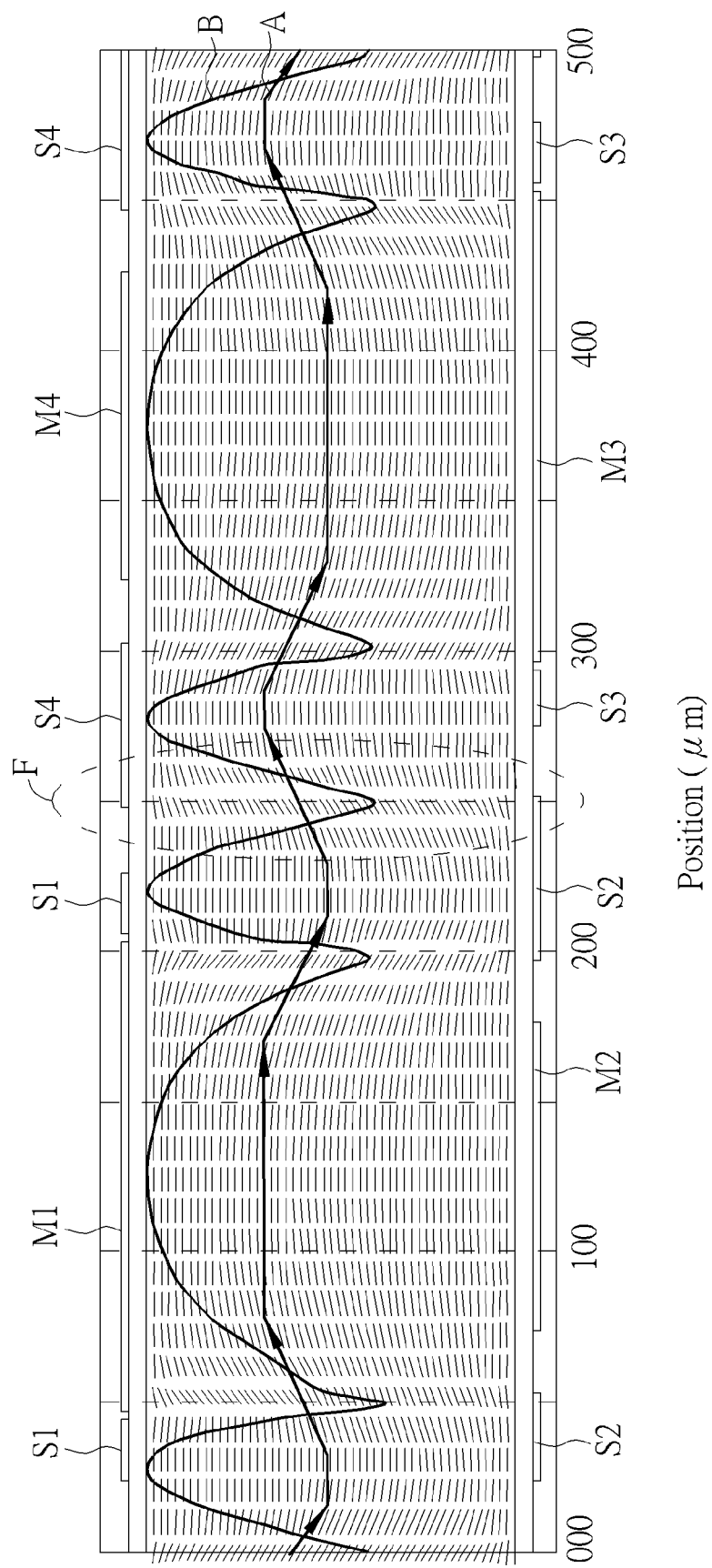
FIG. 11 illustrates a simulation result of phase retardation distribution and long axis arrangement of liquid crystal molecules of the Fresnel liquid crystal lens according to the first embodiment of the present disclosure.
Figure 12:
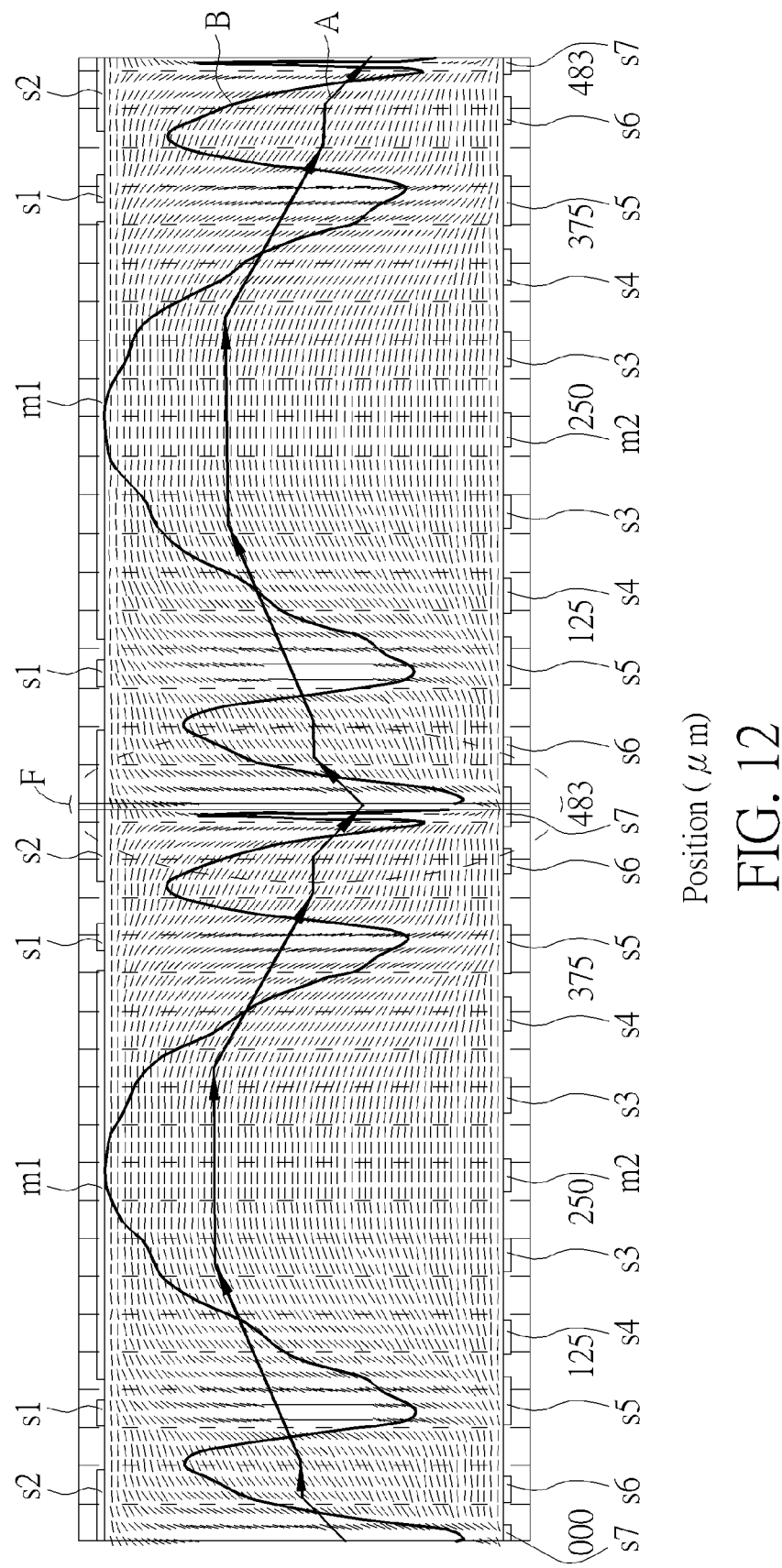
FIG. 12 illustrates a simulation result of phase retardation distribution and long axis arrangement of liquid crystal molecules of the Fresnel liquid crystal lens according to the comparative embodiment of the present disclosure.

Refer to FIG. 11 and FIG. 12. FIG. 11 illustrates a simulation result of phase retardation distribution and long axis arrangement of liquid crystal molecules of the Fresnel liquid crystal lens according to the first embodiment of the present disclosure, and FIG. 12 illustrates a simulation result of phase retardation distribution and long axis arrangement of liquid crystal molecules of the Fresnel liquid crystal lens according to the comparative embodiment of the present disclosure, where the X-Coordinate represents the position in the linear direction L (unit: micrometer (μm)), the arrow of curve A represents the direction of long axis of liquid crystal molecules, and curve B represents the phase retardation distribution. The liquid crystal molecule has a long axis and a short axis. As shown in FIG. 11, the phase retardation distribution of the Fresnel liquid crystal lens according to the first embodiment is more similar to a parabolic curve, and both the variations of long axis arrangement of liquid crystal molecules and phase retardation between two adjacent liquid crystal lens units are smooth and continuous (i.e. curve A and curve B in the common boundary region F between two adjacent liquid crystal lens units), and thus disclination lines will not occur. On the contrary, as shown in FIG. 12, the phase retardation distribution of the Fresnel liquid crystal lens according to the comparative embodiment is an irregularly zigzag curve, and, and both the variations of long axis arrangement of liquid crystal molecules and phase retardation between two adjacent liquid crystal lens units are not smooth, which is messy, disordered and discrete as illustrated in curve A and curve B in the common boundary region F between two adjacent liquid crystal lens units), and thus disclination lines will occur.

The Fresnel liquid crystal lens 50 of the comparative embodiment has more electrodes compared to the Fresnel liquid crystal lens of the first and second embodiments, which increases the structural and process complexity, and decreases the alignment tolerance when assembling the first substrate 52 and the second substrate 54. In addition, the electrodes of the Fresnel liquid crystal lens 50 require higher driving voltage, which increases power consumption. Furthermore, the Fresnel liquid crystal lens 50 has disclination line defects, which severely deteriorates display quality.

Figure 13:
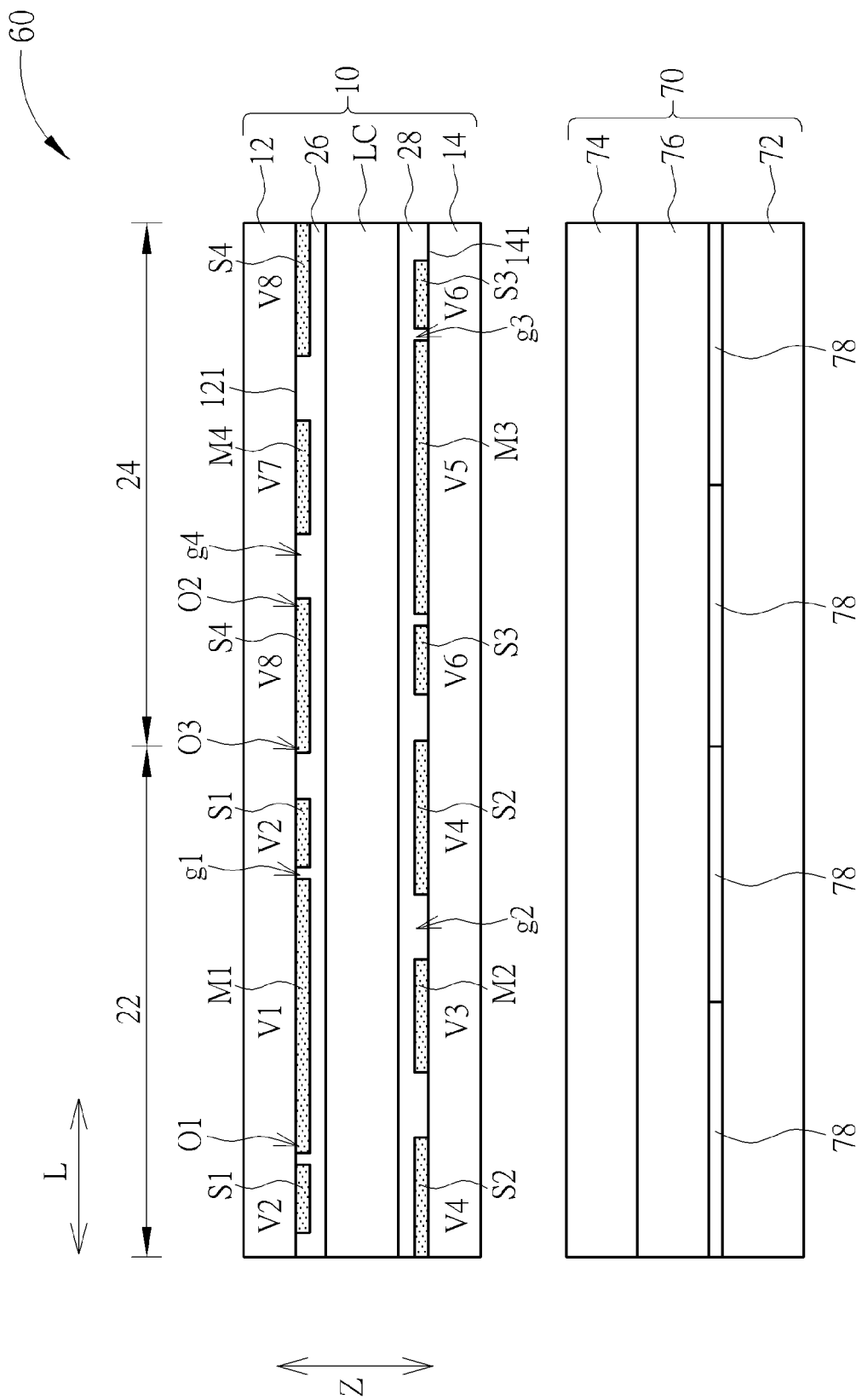
FIG. 13 is a schematic diagram illustrating a 2D/3D switchable display panel according to a first embodiment of the present disclosure.

Refer to FIG. 13. FIG. 13 is a schematic diagram illustrating a 2D/3D switchable display panel according to a first embodiment of the present disclosure. As shown in FIG. 13, the 2D/3D switchable display panel 60 includes a Fresnel liquid crystal lens and a display panel 70 overlapping the Fresnel liquid crystal lens. In this embodiment, the Fresnel liquid crystal lens 10 of the first embodiment (FIG. 1) is selected as an example, but not limited thereto. The Fresnel liquid crystal lens may be that disclosed in other embodiment or alternative embodiment. The display panel 70 includes a third substrate 72, a fourth substrate 74 disposed opposite to the third substrate 72, and a display medium layer 76 disposed between the third substrate 72 and the fourth substrate 74. In an alternative embodiment, the Fresnel liquid crystal lens 10 and the display panel 70 may share the same substrate i.e. the second substrate 14 or the fourth substrate 74, or the second substrate 14 and the fourth substrate 74 may be integrated into one substrate, and thus the Fresnel liquid crystal lens 10 and the display panel 70 include only three substrates. For example, the Fresnel liquid crystal lens 10 and the display panel 70 may only comprise the third substrate 72, the fourth substrate 74 and the first substrate 12 from bottom to top, the third substrate 72, the second substrate 14 and the first substrate 12 from bottom to top, or the third substrate 72 and a substrate integrated by the fourth substrate 74 and the second substrate 14. The display panel may be various types of display panels including a non-self-luminous display panel (e.g. polymer sustained alignment (PSA) display panel, three dimensional shaped pixel electrode (TDE) display panel, E-paper display (EPD), blue phase display panel, Fringe Field Switching (FFS) display panel, In Plane Switching (IPS) display panel, Electrowetting Display (EWD) panel, Multi-domain Vertical Alignment (MVA) display panel, Pattern Vertical Alignment (PVA) display panel, Color Filter on Array (COA) display panel of the aforementioned type of display panel, Array on Color Filter (AOC) display panel of the aforementioned type of display pane or other suitable non-self-luminous display panels); a self-luminous display panel (e.g. organic electroluminescent display panel, inorganic electroluminescent display panel, a combination thereof or other suitable self-luminous display panels), other suitable display panels or a combination thereof. The material of the display medium layer 76 may be non-self-luminous material and/or self-luminous material. The display panel 70 includes a plurality of sub-pixels 78 arranged in matrix, and each sub-pixel 78 may at least include a transistor (not shown) having a gate electrode (not shown) electrically to at least one scan line (not shown), a source electrode (not shown) electrically connected to at least one data line (not shown) and a drain electrode (not shown) electrically connected to at least one pixel electrode (not shown). In addition, the corresponsive relation between the liquid crystal lens units of the Fresnel liquid crystal lens 10 and the sub-pixels 78 of the display panel 70 may be adjusted based on different requirements. For example, along a linear direction L, one liquid crystal lens unit (e.g. the first liquid crystal lens unit 22 or the second liquid crystal lens unit 24) may overlap two or more sub-pixels 78 in the vertical projection direction Z; in another linear direction, one liquid crystal lens unit (e.g. the first liquid crystal lens unit 22 or the second liquid crystal lens unit 24) may overlap one, more than one or all sub-pixels 78 in the vertical projection direction Z.

The 2D/3D switchable display panel 60 is able to provide a flat (two dimensional) display mode and a stereoscopic (three dimensional) display mode. In a 2D display mode, the Fresnel liquid crystal lens 10 is turned off, and the images provided by the display panel 70 will penetrate through the Fresnel liquid crystal lens 10 without refractions so as to provide a 2D display effect. In a 3D display mode, the Fresnel liquid crystal lens 10 is turned on, and the images provided by the display panel 70 will penetrate through the Fresnel liquid crystal lens 10 with refractions so as to provide a 3D display effect.

In this embodiment, the Fresnel liquid crystal lens 10 is disposed on the display panel 70, i.e. the Fresnel liquid crystal lens 10 is disposed on the display surface of the display panel 70, but not limited thereto. In an alternative embodiment, the Fresnel liquid crystal lens 10 may be disposed under the display panel 70 or inside the display panel 70. In addition, either the first substrate 12 or the second substrate 14 may be the substrate which is closer and adjacent to the display panel 70.

Figure 14:
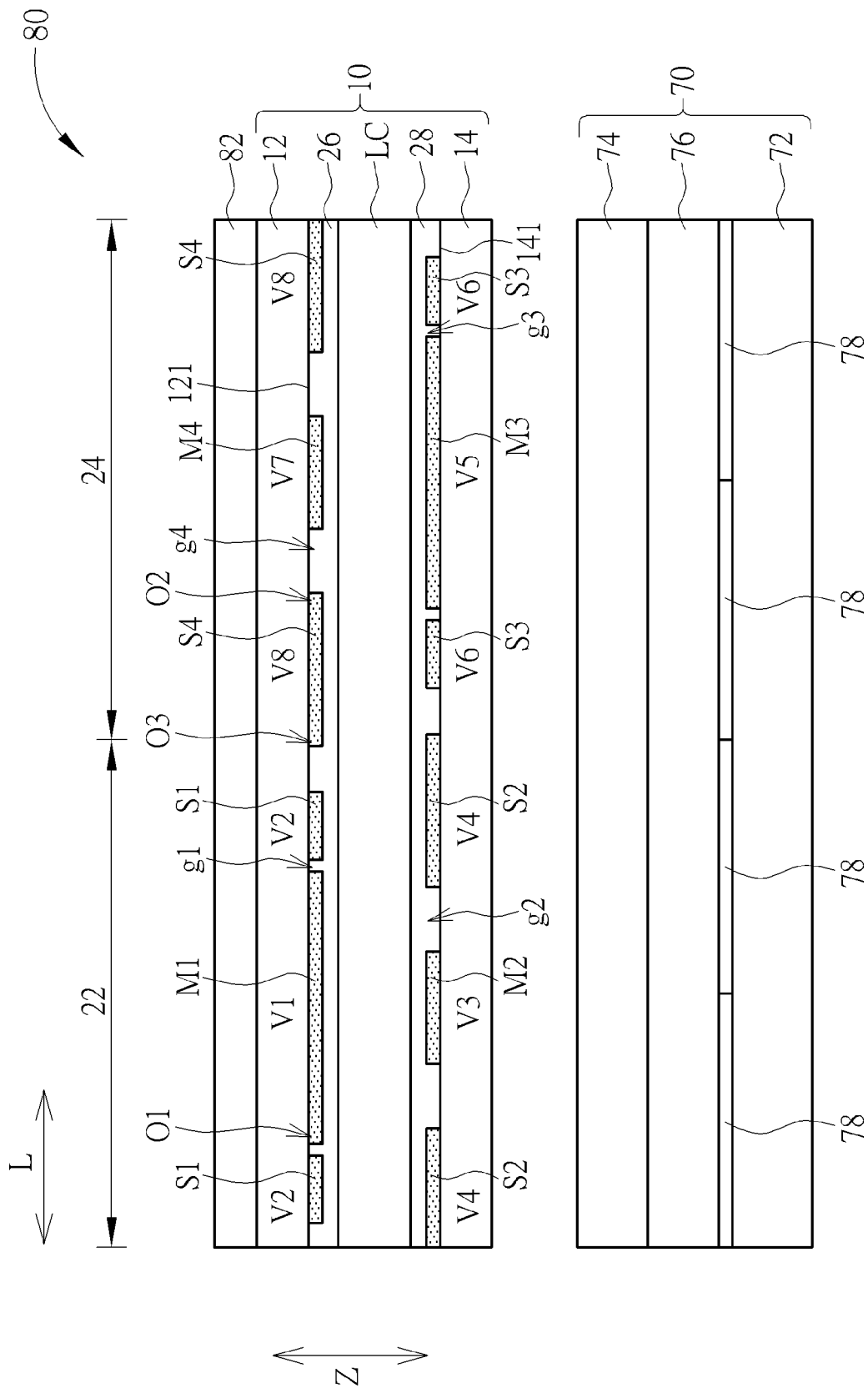
FIG. 14 is a schematic diagram illustrating a 2D/3D switchable display panel according to a first/second embodiment of the present disclosure.

Refer to FIG. 14. FIG. 14 is a schematic diagram illustrating a 2D/3D switchable display panel according to a first/second embodiment of the present disclosure. As shown in FIG. 14, different from the first embodiment, the 2D/3D switchable display panel 80 of the first/second embodiment may further include a touch input device 82 overlapping the Fresnel liquid crystal lens 10 and the display panel 70. For example, the touch input device 82 may be disposed on the Fresnel liquid crystal lens 10 i.e. disposed on the outer surface of the first substrate 72, but not limited thereto. In other alternative embodiments, the touch input device 82 may be disposed inside the Fresnel liquid crystal lens 10, between the Fresnel liquid crystal lens 10 and the display panel 70, inside the display panel 70, outside the display panel 70 or in any proper position. In addition, the touch input device 82 may be a capacitive touch input device, a resistive touch input device, an optical touch input device or other types of touch input devices.

In conclusion, the Fresnel liquid crystal lens of the present disclosure is able to implement the lenticular effect of areal Fresnel liquid crystal lens by virtue of the aforementioned overlapping electrode arrangement accompanied with corresponding driving voltage. The Fresnel liquid crystal lens has simplified structure and process steps, low driving voltage and high alignment tolerance, and no disclination lines will occur when displaying.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A Fresnel liquid crystal lens, comprising:
   a first substrate;
   a second substrate, disposed opposite to the first substrate;
   a liquid crystal layer, disposed between the first substrate and the second substrate;
   a plurality of first liquid crystal lens units, wherein each of the first liquid crystal lens units comprises:
      a first main electrode, disposed on a surface of the first substrate facing the liquid crystal layer, wherein the first main electrode has a first voltage;
      at least two first sub electrodes, disposed on the surface of the first substrate facing the liquid crystal layer and located on two opposite sides of the first main electrode, wherein the first sub electrodes have a second voltage, and a first gap exists between the first main electrode and each of the first sub electrodes;
      a second main electrode, disposed on a surface of the second substrate facing the liquid crystal layer, wherein the second main electrode has a third voltage; and at least two second sub electrodes, disposed on the surface of the second substrate facing the liquid crystal layer and located on two opposite sides of the second main electrode, wherein the second sub electrodes have a fourth voltage, a second gap exists between the second main electrode and each of the second sub electrodes, the first main electrode overlaps the second main electrode in a vertical projection direction, the first sub electrodes overlap the second sub electrodes in the vertical projection direction respectively, and the first main electrode partially overlaps the second sub electrodes in the vertical projection direction respectively; and a plurality of second liquid crystal lens units, the second liquid crystal lens units and the first liquid crystal lens units being arranged alternately, wherein each of the second liquid crystal lens units comprises:

a third main electrode, disposed on the surface of the second substrate facing the liquid crystal layer, wherein the third main electrode has a fifth voltage;

at least two third sub electrodes, disposed on the surface of the second substrate facing the liquid crystal layer and located on two opposite sides of the third main electrode, wherein the third sub electrodes have a sixth voltage, and a third gap exists between the third main electrode and each of the third sub electrodes;

a fourth main electrode, disposed on the surface of the first substrate facing the liquid crystal layer, wherein the fourth main electrode has a seventh voltage; and at least two fourth sub electrodes, disposed on the surface of the first substrate facing the liquid crystal layer and located on two opposite sides of the fourth main electrode, wherein the fourth sub electrodes have an eighth voltage, a fourth gap exists between the fourth main electrode and each of the fourth sub electrodes, the third main electrode overlaps the fourth main electrode in the vertical projection direction, the third sub electrodes overlap the fourth sub electrodes in the vertical projection direction respectively, and the third main electrode partially overlaps the fourth sub electrodes in the vertical projection direction respectively.

2. The Fresnel liquid crystal lens of claim 1, wherein a dimension of the first main electrode is substantially equal to a dimension of the third main electrode, a dimension of the second main electrode is substantially equal to a dimension of the fourth main electrode, and the dimension of the first main electrode is larger than the dimension of the second main electrode.

3. The Fresnel liquid crystal lens of claim 1, wherein a dimension of each of the first sub electrodes is substantially equal to a dimension of each of the third sub electrodes, a dimension of each of the second sub electrodes is substantially equal to a dimension of each of the fourth sub electrodes, and the dimension of each of the first sub electrodes is smaller than the dimension of each of the second sub electrodes.

4. The Fresnel liquid crystal lens of claim 1, wherein the first gap is substantially equal to the third gap, the second gap is substantially equal to the fourth gap, and the first gap is smaller than the second gap.

5. The Fresnel liquid crystal lens of claim 1, wherein the first main electrode and the second sub electrode have a first overlapping portion in the vertical projection direction, the first overlapping portion has a first overlapping width substantially greater than 0 micrometer and less than or equal to 50 micrometers, the third main electrode and the fourth sub electrode have a second overlapping portion in the vertical projection direction, and the second overlapping portion has a second overlapping width substantially greater than 0 micrometer and less than or equal to 50 micrometers.

6. The Fresnel liquid crystal lens of claim 1, wherein the second sub electrode and the fourth sub electrode have a third overlapping portion, and the third overlapping portion has a third overlapping width substantially greater than 0 micrometer and less than or equal to 50 micrometers.

7. The Fresnel liquid crystal lens of claim 1, wherein a polarity of the second voltage, the fourth voltage, the fifth voltage and the seventh voltage is opposite to a polarity of the first voltage, the third voltage, the sixth voltage and the eighth voltage.

8. The Fresnel liquid crystal lens of claim 1, wherein the first main electrode and the second main electrode have a first voltage difference, the first main electrode and the second sub electrode have a second voltage difference, an absolute value of the first voltage difference is less than an absolute value of the second voltage difference, a voltage difference between the first sub electrode and the second sub electrode is substantially equal to 0, the third main electrode and the fourth main electrode have a third voltage difference, the third main electrode and the fourth sub electrode have a fourth voltage difference, an absolute value of the third voltage difference is less than an absolute value of the fourth voltage difference, and a voltage difference between the third sub electrode and the fourth sub electrode is substantially equal to 0.

9. The Fresnel liquid crystal lens of claim 1, wherein
each of the first liquid crystal lens units further comprises:
at least one fifth sub electrode, disposed on the surface of the first substrate facing the liquid crystal layer and located on at least one of two opposite sides of the first sub electrodes with respect to the first main electrode, wherein the at least one fifth sub electrode has a ninth voltage; and at least one sixth sub electrode, disposed on the surface of the second substrate facing the liquid crystal layer and located on at least one of two opposite sides of the second sub electrodes with respect to the second main electrode, wherein the at least one sixth sub electrode has a tenth voltage; and each of the second liquid crystal lens units further comprises:
at least one seventh sub electrodes, disposed on the surface of the second substrate facing the liquid crystal layer and located on at least one of two opposite sides of the third sub electrodes with respect to the third main electrode, wherein the at least one seventh sub electrode has an eleventh voltage; and at least one eighth sub electrodes, disposed on the surface of the first substrate facing the liquid crystal layer and located on at least one of two opposite sides of the fourth sub electrodes with respect to the fourth main electrode, wherein the at least one eighth sub electrode has a twelfth voltage.

10. The Fresnel liquid crystal lens of claim 9, wherein a dimension of the at least one fifth sub electrode is substantially equal to a dimension of the at least one seventh sub electrode, a dimension of the at least one sixth sub electrode is substantially equal to a dimension of the at least one eighth sub electrode, and the dimension of the at least one sixth sub electrode is smaller than the dimension of the at least one fifth sub electrode.

11. The Fresnel liquid crystal lens of claim 9, wherein the fifth sub electrode overlaps the sixth sub electrode in the vertical projection direction, the seventh sub electrode overlaps the eighth sub electrode in the vertical projection direction, the fifth sub electrode partially overlaps the second sub electrode and the seventh sub electrode in the vertical projection direction respectively, and the seventh sub electrode partially overlaps the fourth sub electrode and the fifth sub electrode in the vertical projection direction respectively.

12. The Fresnel liquid crystal lens of claim 9, wherein the ninth voltage is substantially equal to the first voltage, the tenth voltage is substantially equal to the first voltage, the eleventh voltage is substantially equal to the fifth voltage, and the twelfth voltage is substantially equal to the fifth voltage.

13. The Fresnel liquid crystal lens of claim 9, wherein the fifth sub electrode and the second sub electrode have a fifth voltage difference, the seventh sub electrode and the fifth sub electrode have a sixth voltage difference, the seventh sub electrode and the fourth sub electrode have a seventh voltage difference, an absolute value of the fifth voltage difference is substantially equal to an absolute value of the sixth voltage difference, an absolute value of the fifth voltage difference is substantially equal to an absolute value of the seventh voltage difference, a voltage difference between the fifth sub electrode and the sixth sub electrode is substantially equal to 0, and a voltage difference between the seventh sub electrode and the eighth sub electrode is substantially equal to 0.

14. The Fresnel liquid crystal lens of claim 1, wherein the first liquid crystal lens units and the second liquid crystal lens units are alternately arranged along a linear direction.

15. A 2D/3D switchable display panel, comprising:
the Fresnel liquid crystal lens of claim 1; and
a display panel, overlapping the Fresnel liquid crystal lens, wherein the display panel comprises:
a third substrate;
a fourth substrate, disposed opposite to the third substrate; and
a display medium layer, disposed between the third substrate and the fourth substrate.

16. The 2D/3D switchable display panel of claim 15, further comprising a touch input device, overlapping the Fresnel liquid crystal lens and the display panel.

* * * * *